United States Patent
Yamamoto

(10) Patent No.: US 9,594,962 B2
(45) Date of Patent: Mar. 14, 2017

(54) IMAGING PROCESSING SYSTEM AND METHOD AND MANAGEMENT APPARATUS

(71) Applicant: CANON KABUSHIKI KAISHA, Tokyo (JP)

(72) Inventor: Kei Yamamoto, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/950,310

(22) Filed: Nov. 24, 2015

(65) Prior Publication Data

US 2016/0078301 A1 Mar. 17, 2016

Related U.S. Application Data

(60) Continuation of application No. 13/798,859, filed on Mar. 13, 2013, which is a division of application No. 12/360,784, filed on Jan. 27, 2009, now Pat. No. 8,693,738.

(30) Foreign Application Priority Data

Jan. 29, 2008 (JP) .................................. 2008-018353
Mar. 4, 2008 (JP) .................................. 2008-053951

(51) Int. Cl.
*G06K 9/00* (2006.01)
*H04N 5/232* (2006.01)
*G06K 9/32* (2006.01)

(52) U.S. Cl.
CPC ..... *G06K 9/00771* (2013.01); *G06K 9/00885* (2013.01); *G06K 9/3241* (2013.01); *H04N 5/232* (2013.01); *H04N 5/23296* (2013.01)

(58) Field of Classification Search
USPC ................................. 382/115–118, 124–127
See application file for complete search history.

(56) References Cited

U.S. PATENT DOCUMENTS

| 7,336,807 B2 | 2/2008 | Tabata |
| 7,440,594 B2 | 10/2008 | Takenaka |
| 2003/0023974 A1 | 1/2003 | Dagtas et al. |

(Continued)

FOREIGN PATENT DOCUMENTS

| JP | 6-325180 A | 11/1994 |
| JP | 2004-343718 A | 12/2004 |
| JP | 2007-067963 A | 3/2007 |

*Primary Examiner* — Alex Liew
(74) *Attorney, Agent, or Firm* — Carter, DeLuca, Farrell & Schmidt, LLP

(57) ABSTRACT

An imaging processing system includes one or more image capturing apparatuses, a reading unit configured to read biometric information from an authentication object person, a similarity calculation unit configured to calculate similarity based on a result of comparing biometric information read by the reading unit with true biometric information of the authentication object person, an authentication unit configured to perform authentication based on a comparison between the similarity calculated by the similarity calculation unit and a preliminarily set threshold, and a control unit configured to control, if the authentication performed by the authentication unit is successful, imaging processing, which is performed by the image capturing apparatus, based on the similarity calculated by the similarity calculation unit.

17 Claims, 21 Drawing Sheets

| USER | DAY OF WEEK | ENTRY TIME |
|---|---|---|
| A | MONDAY | 09:00:30 |
| A | MONDAY | 09:02:55 |
| A | MONDAY | 10:32:00 |
| A | MONDAY | 11:50:30 |
| ... | | |
| A | MONDAY | 14:55:30 |
| A | MONDAY | 18:05:00 |
| A | MONDAY | 18:15:30 |

(56) References Cited

U.S. PATENT DOCUMENTS

| | | |
|---|---|---|
| 2004/0086157 A1 | 5/2004 | Sukegawa |
| 2004/0130620 A1 | 7/2004 | Buehler et al. |
| 2005/0057653 A1 | 3/2005 | Maruya |
| 2007/0141939 A1 | 6/2007 | Sandbach et al. |
| 2007/0182818 A1 | 8/2007 | Buehler |
| 2007/0237357 A1 | 10/2007 | Low |
| 2007/0237358 A1 | 10/2007 | Tseng et al. |
| 2009/0322882 A1* | 12/2009 | Seo .................. G06T 7/2006 348/155 |

* cited by examiner

FIG.12

| USER | DAY OF WEEK | ENTRY ALLOWABLE TIME PERIOD |
|---|---|---|
| A | MONDAY | 07:00:00 ~ 22:00:00 |
| A | TUESDAY | 07:00:00 ~ 22:00:00 |
| A | WEDNESDAY | 07:00:00 ~ 22:00:00 |
| A | THURSDAY | 07:00:00 ~ 22:00:00 |
| A | FRIDAY | 07:00:00 ~ 22:00:00 |

FIG.13

| USER | DAY OF WEEK | ENTRY TIME |
|---|---|---|
| A | MONDAY | 09:00:30 |
| A | MONDAY | 09:02:55 |
| A | MONDAY | 10:32:00 |
| A | MONDAY | 11:50:30 |
| ... | | |
| A | MONDAY | 14:55:30 |
| A | MONDAY | 18:05:00 |
| A | MONDAY | 18:15:30 |

| USER | ENTRY TIME |
|---|---|
| A | 200X/X/X 11:38:30 |
| B | 200X/X/X 11:40:50 |
| C | 200X/X/X 12:01:05 |
| D | 200X/X/X 12:05:30 |
| E | 200X/X/X 12:15:30 |
| F | 200X/X/X 12:15:30 |

802

| USER | UTILIZATION TIME PERIOD |
|---|---|
| A | 10:00:00 ~ 11:00:00 |
| B | 10:00:00 ~ 11:00:00 |
| C | 14:00:00 ~ 15:00:00 |
| D | 12:00:00 ~ 13:00:00 |
| E | 12:00:00 ~ 13:00:00 |
| F | 09:00:00 ~ 10:00:00 |

803

| USER | TIME DIFFERENCE (803a) | TRACKING FLAG (803b) | TRACKING TIME (803c) |
|---|---|---|---|
| A | 00:38:30 | True | 00:37:00 |
| B | 00:40:50 | True | 00:34:40 |
| C | 01:58:55 | True | 00:14:25 |
| D | 0 | False | — |
| E | 0 | False | — |
| F | 02:15:30 | False | — |

| USER | ENTRY TIME |
|---|---|
| A | 200X/X/X 11:38:30 |
| B | 200X/X/X 11:40:50 |
| C | 200X/X/X 12:01:05 |
| D | 200X/X/X 12:05:30 |

*1002*

| USER | UTILIZATION TIME PERIOD |
|---|---|
| A | 10:00:00 ~ 11:00:00 |
| B | 10:00:00 ~ 11:00:00 |
| C | 14:00:00 ~ 15:00:00 |
| D | 12:00:00 ~ 13:00:00 |

*1003*

| USER | TIME DIFFERENCE *1003a* | PRIORITY *1003b* |
|---|---|---|
| A | 00:38:30 | 3 |
| B | 00:40:50 | 2 |
| C | 01:58:55 | 1 |
| D | 0 | — |

FIG.20

| USER | ENTRY TIME |
|---|---|
| A | 200X/X/X 11:38:30 |
| B | 200X/X/X 11:40:50 |
| C | 200X/X/X 12:01:05 |
| D | 200X/X/X 12:05:30 |
| E | 200X/X/X 12:15:30 |
| F | 200X/X/X 12:15:30 |

| USER | UTILIZATION TIME PERIOD |
|---|---|
| A | 10:00:00 ~ 11:00:00 |
| B | 10:00:00 ~ 11:00:00 |
| C | 14:00:00 ~ 15:00:00 |
| D | 12:00:00 ~ 13:00:00 |
| E | 09:00:00 ~ 10:00:00 |
| F | 12:00:00 ~ 13:00:00 |

| USER | TIME DIFFERENCE | PRIORITY |
|---|---|---|
| A | 00:38:30 | — |
| B | 00:40:50 | 2 |
| C | 01:58:55 | 1 |
| D | 0 | — |
| E | 02:15:30 | 3 |
| F | 0 | — |

1103a ─ TIME DIFFERENCE
1103b ─ PRIORITY

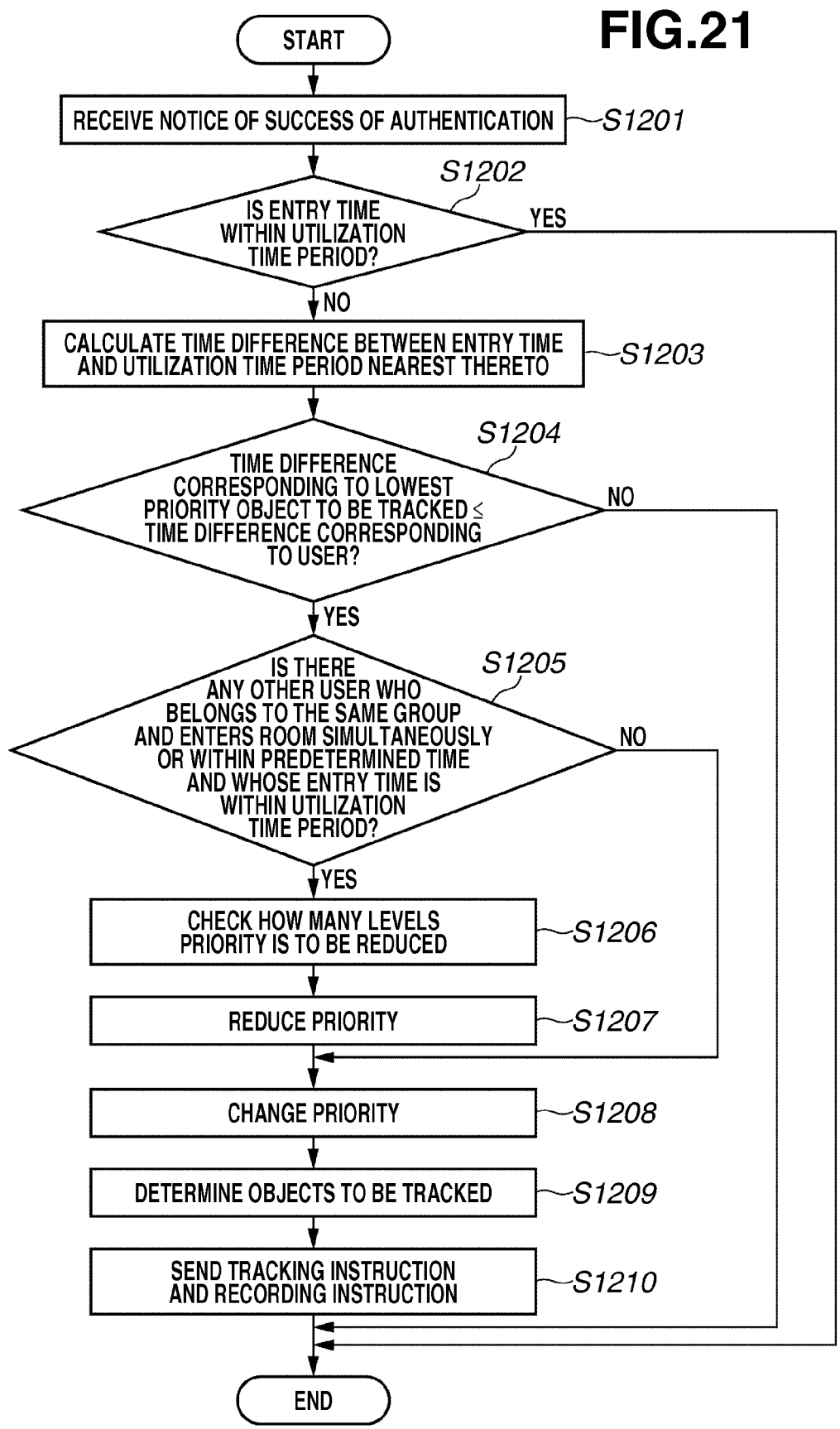

IMAGING PROCESSING SYSTEM AND METHOD AND MANAGEMENT APPARATUS

CROSS REFERENCE TO RELATED APPLICATIONS

This application is a continuation of Ser. No. 13/798,859, filed Mar. 13, 2013, which is a divisional of U.S. Pat. No. 8,693,738, filed on Jan. 27, 2009, which claims the benefit and priority of Japanese Patent Application No. 2008-018353, filed on Jan. 29, 2008, and Japanese Patent Application No. 2008-053951, filed on Mar. 4, 2008, each of which are hereby incorporated by reference in their entireties.

BACKGROUND OF THE INVENTION

Field of the Invention

The present invention relates to techniques for controlling imaging processing.

Description of the Related Art

Hitherto, there have been proposed techniques for determining an object to be imaged (hereinafter referred to as an "imaging object"), e.g., a suspicious person in a building or a room, in which an image capturing apparatus is placed, and for tracking and imaging the object with the image capturing apparatus.

Regarding such techniques, e.g., Japanese Patent Application Laid-Open No. 6-325180 discusses a method in which a person such as an observer specifies a person to be tracked (hereinafter referred to as a tracking object) and in which a plurality of image capturing apparatuses performs tracking of the specified person in cooperation with one another. Further, Japanese Patent Application Laid-Open No. 2007-67963 discusses a method for sequentially assigning, in the case of a changing relationship between the number of image capturing apparatuses and imaging objects, the image capturing apparatuses to the imaging objects.

Generally, in biometric authentication, the success or failure of authentication is determined by comparison between a similarity, which is calculated by collating biometric information read by a biometric authentication apparatus with a template (preliminarily registered true biometric information) and a preliminarily set threshold.

FIG. 9 illustrates normalized frequency distributions of similarity, which respectively correspond to an impostor template and a client template. The axis of abscissa represents similarity. The axis of ordinate represents frequency. Therefore, the similarity increases to the right, as viewed in FIG. 9. This means that the degree of match between two pieces of biometric information, which are to be compared with each other, increases to the right. In a case where the similarity is equal to or higher than a predetermined threshold, it is determined that the two pieces of biometric information match each other. Otherwise, it is determined that the two pieces of biometric information do not match each other.

Biometric authentication includes a trade-off between the false rejection rate (FRR) and the false acceptance rate (FAR). The FRR is a probability at which an identical person to be verified (hereinafter called a "client") is falsely rejected as any person other than the client (hereinafter called an "impostor"). The FAR is a probability at which an imposer is falsely accepted as a true client.

The ratio of the FRR to the FAR is determined by setting a threshold. When the threshold is set at a small value, the FRR, at which a true client is falsely rejected, is low, while the FAR, at which an imposer is falsely accepted, is high. Conversely, when the threshold is set at a large value, the FAR, at which an imposer is falsely accepted, is low, while the FRR, at which a true client is falsely rejected, is high. Specifically, in a building and a room the security of each of which is treated as important, it is necessary to improve the security by monitoring a person who enters the building or the room while being falsely accepted at the FAR.

Meanwhile, according to the method discussed in Japanese Patent Application Laid-Open No. 6-325180, an observer determines whether the specified person is a proper tracking object. Accordingly, the observer should be very familiar with users and usages of the building or the room. In this case, the observer bears a heavy load. In addition, the observer might be unable to make a correct decision. Thus, security accuracy cannot be sufficient.

According to the method discussed in Japanese Patent Application Laid-Open No. 2007-67963, the image capturing apparatuses are sequentially assigned to the imaging objects. Thus, even in a case where a person who is being imaged is a proper tracking object, the image capturing apparatus may be assigned to a person other than the proper person. Accordingly, the method discussed in Japanese Patent Application Laid-Open No. 2007-67963 is unsuitable for tracking a specific person. Thus, security accuracy cannot be sufficient.

The level of observation of a person in a building and a room, the security of each of which is treated as important, can be increased by recording a video image of the person imaged by the image capturing apparatus. However, in a case where a video image of a person is always recorded, a huge volume of recorded image data is accumulated. Accordingly, a system is required, which is adapted to automatically record image data only when the image data is needed.

SUMMARY OF THE INVENTION

The present invention is directed to an imaging processing system capable of improving security by controlling imaging processing performed using an image capturing apparatus according to similarity calculated by biometric authentication. In addition, the present invention is directed to an image capturing system capable of improving monitoring accuracy, alleviating a load on an observer, and reducing recorded data.

According to an aspect of the present invention, a imaging processing system includes one or more image capturing apparatuses, a reading unit configured to read biometric information from an authentication object person, a similarity calculation unit configured to calculate similarity based on a result of comparing biometric information read by the reading unit with true biometric information of the authentication object person, an authentication unit configured to perform authentication based on a comparison between the similarity calculated by the similarity calculation unit and a preliminarily set threshold, and a control unit configured to control, if the authentication performed by the authentication unit is successful, imaging processing, which is performed by the image capturing apparatus, based on the similarity calculated by the similarity calculation unit.

According to another aspect of the present invention, an image capturing system includes one or more image capturing apparatuses, a control apparatus configured to control the one or more image capturing apparatuses, an entry time determination unit configured to determine whether a time at which an imaging object enters an imageable area of the image capturing apparatus is included within a predetermined time period, and a processing unit configured to change processing to be performed by the image capturing apparatus according to a result of determination performed by the entry time determination unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 12 illustrates an example of entry allowable time periods for each user, which are employed in the entry and exit management system according to the third exemplary embodiment of the present invention.

FIG. 13 illustrates an example of information concerning a history of use and a utilization time of each user, which are employed in the entry and exit management system according to the third exemplary embodiment of the present invention.

FIG. 17 illustrates an example of a tracking/recording management table employed in the entry and exit management system according to the third exemplary embodiment of the present invention.

FIG. 19 illustrates an example of a tracking/recording management table employed in the entry and exit management system according to a fourth exemplary embodiment of the present invention.

FIG. 20 illustrates another example of the tracking/recording management table employed in the entry and exit management system according to the fourth exemplary embodiment of the present invention.

FIG. 21 illustrates a flow of an operation of the tracking/recording management table employed in the entry and exit management system according to the fourth exemplary embodiment of the present invention in the case of determining a tracking object.

DETAILED DESCRIPTION OF THE EMBODIMENTS

Various exemplary embodiments, features, and aspects of the invention will be described in detail below with reference to the drawings.

Figure 1:
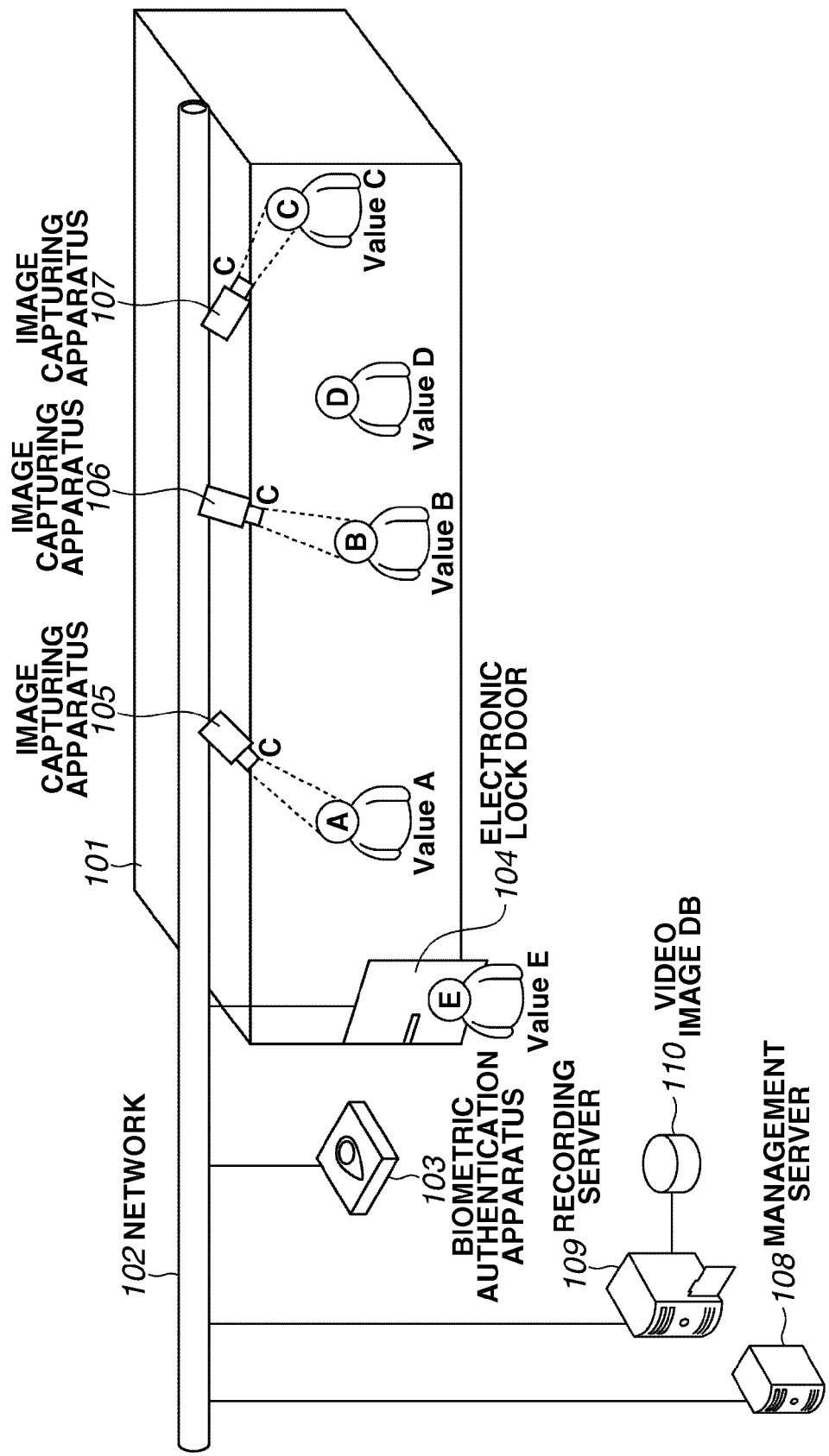
FIG. 1 illustrates an example of a configuration of an imaging processing system according to a first exemplary embodiment of the present invention.

FIG. 1 illustrates an example of the configuration of an imaging processing system according to a first exemplary embodiment of the present invention.

In a room 101, a biometric authentication apparatus 103, an electronic lock door 104, image capturing apparatuses 105 through 107, a management server 108, a recording server 109, a video image database (DB) 110, and the like are connected to one another via a network 102 such as a local area network (LAN).

Further, it is sufficient that the management server 108, the recording server 109, and the video image DB 110 are connected to be communicatable with one another. The management server 108, the recording server 109, and the video image DB 110 can be installed either outside or inside the room 101. Additionally, it is sufficient that component apparatuses of the imaging processing system are communicatable with one another. It is not always necessary that the component apparatuses of the imaging processing system communicate with one another using the network 102.

The image capturing apparatuses 105 to 107 are configured to image persons who enter the room 101. Each of the image capturing apparatuses 105 to 107 is adapted to image a single person. Incidentally, a case of providing three image capturing apparatuses according to the present embodiment in the room 101 is described herein by way of example. The number of image capturing apparatuses installed therein can be either 1 or other positive integers.

When a person enters the room 101, the biometric authentication apparatus 103 reads biometric information of this person. Then, the biometric authentication apparatus 103 performs authentication of this person. Actual authentication is performed at the management server 108. Thus, the biometric authentication apparatus 103 sends the read biometric information to the management server 108. Incidentally, the system can be constructed so that authentication is performed at the biometric authentication apparatus 103.

The management server 108 manages and controls the biometric authentication apparatus 103, the electronic lock door 104, the image capturing apparatuses 105 through 107, and the recording server 109. The system can be provided with a plurality of management servers respectively corresponding to apparatuses to be managed and controlled.

The electronic lock door 104 is usually put in a lock state. The lock performed by the electronic lock door 104 is cancelled in a case where authentication is successful. The cancellation of the lock by the electronic lock door 104 is performed under the control of the management server 108 in response to the success of authentication.

The recording server 109 performs a control operation of accumulating imaging data representing images imaged by the image capturing apparatuses 105 through 107 using the video image DB 110. Recording of the images by the recording server 109 is performed under the control of the management server 108.

Persons A, B, C, and D are in the room 101. A value of similarity calculated at the authentication corresponding to the person A is "Value A". That of similarity calculated at the authentication corresponding to the person B is "Value B". That of similarity calculated at the authentication corresponding to the person C is "Value C". That of similarity calculated at the authentication corresponding to the person D is "Value D". These values of similarity have the following relationship: "Value A"<"Value B"<"Value C"<"Value D". That is, the value of similarity of the person D is highest among these values thereof, while that of similarity of the person A is lowest thereamong. Incidentally, a value of similarity of a person is calculated based on a result of comparing biometric information read in the authentication performed at the entry of the person into the room with template information (i.e., true biometric information of that person registered in advance).

The image capturing apparatuses 105 through 107 preferentially perform tracking-imaging of a person having a low value of similarity. This is because each of these image capturing apparatuses preferentially monitors a person who is successful in the authentication as a result of false recognition with high probability. In the present embodiment, three image capturing apparatuses are installed in the room. In addition, a single person is tracked by a single image capturing apparatus. Accordingly, the person A, the person B, and the person C are determined to be imaging objects. More specifically, the image capturing apparatus 105 performs tracking-imaging of the person A. The image capturing apparatus 106 performs tracking-imaging of the person B. The image capturing apparatus 107 performs tracking-imaging of the person C. The image capturing apparatuses image the persons by automatically being switched according to the positions of the persons.

When a person E tries to enter the room 101, authentication is performed. Then, the person E authenticates himself by holding and applying his fingerprint or cornea to the biometric authentication apparatus 103. Thus, biometric information of the person E is read by the biometric authentication apparatus 103. Then, authentication is performed using the read biometric information and template information.

When the value of similarity between the biometric information and the template information exceeds a predetermined threshold (hereinafter referred to as an authentication threshold), the authentication is successful. Otherwise, the authentication is failed. In a case where the authentication is successful, if the number of imaging objects (i.e., the number of persons already determined as imaging objects) does not reach an imaging-object upper limit number (i.e., an upper limit to the number of imaging objects), the person E is determined as an imaging object under such a condition. If the number of imaging objects reaches the imaging-object upper limit number, it is determined according to a calculated value "Value E" of similarity of the person E whether the person E is determined as a tracking-imaging object, on which tracking-imaging is performed. Incidentally, in the present embodiment, the imaging-object upper limit number is assumed to be set at 3.

In this case, the persons A, B, and C are already determined as the imaging objects. The number of the imaging objects is equal to the imaging-object upper limit number (i.e., 3). Therefore, the person E is determined as an imaging object in a case where the value of similarity of the person E is lower than the highest value of similarity of the persons already determined as the imaging objects. That is, if the value "Value E" of similarity of the person E is lower than the highest value "Value C" of similarity of the person C among those of similarity of the persons already determined as the imaging objects, the person E is employed as an imaging object, instead of the person C. In the present embodiment, it is assumed that the value "Value C" and the value "Value E" have the following relationship: "Value E"<"Value C".

Figure 2:
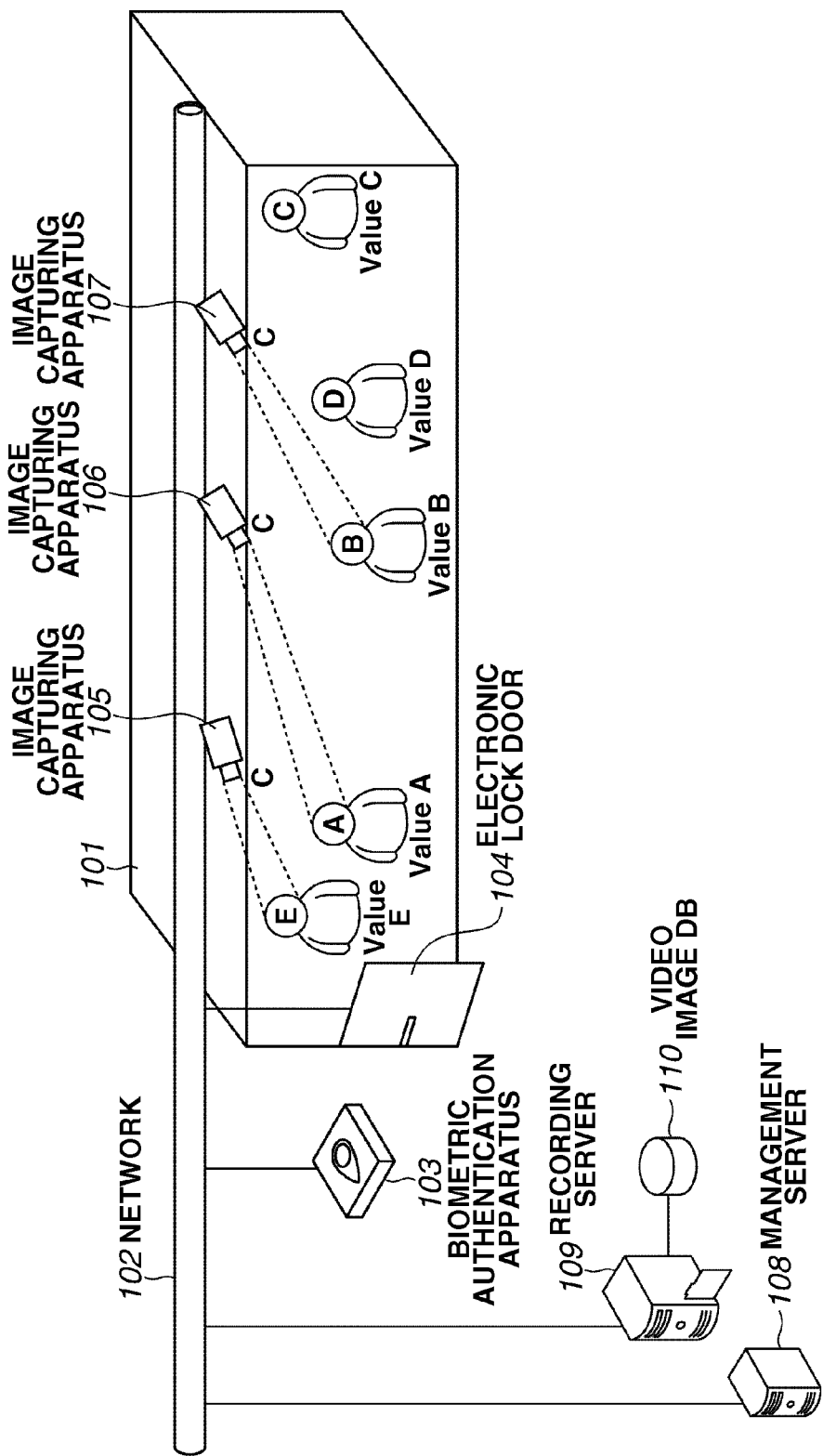
FIG. 2 illustrates an example of a mode in a case where an imaging object is changed in the imaging processing system illustrated in FIG. 1.

As a result of comparing the values of similarity of the persons, the person E is employed as an imaging object. The person C is taken off a category of the imaging objects. More specifically, as illustrated in FIG. 2, members of the category of the imaging objects are changed from the persons A, B, and C to the persons A, B, and E. Subsequently, every time a new person tries to enter the room 101, the aforementioned process is repeatedly performed.

Figure 3:
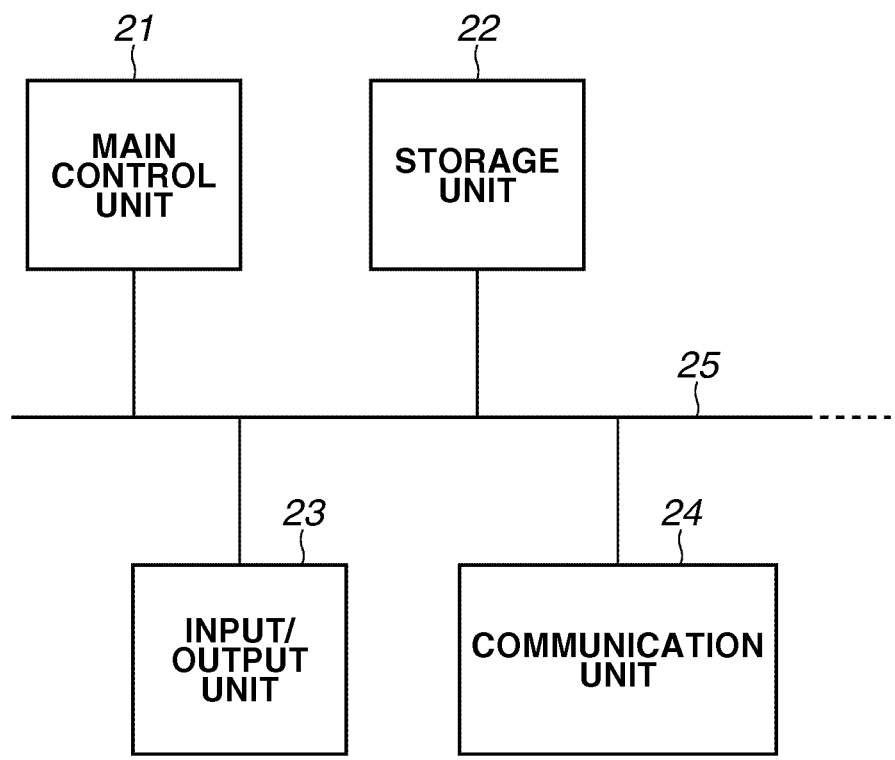
FIG. 3 illustrates an example of a configuration of a computer incorporated into each apparatus of the imaging processing system illustrated in FIG. 1.

In the foregoing description, an example of the configuration of the imaging processing system has been described. Incidentally, e.g., a computer illustrated in FIG. 3 is incorporated in each of the biometric authentication apparatus 103, the management server 108, and the recording server 109, which have been described in the foregoing description. The computer is provided with a main control unit such as a central processing unit (CPU) 21 and a storage unit 22 including a read-only memory (ROM), a random access memory (RAM), and a hard disk drive (HDD). In addition, the computer is provided also with an input/output unit 23, which includes a keyboard, a mouse, a display device, or a touch panel, and with a communication unit 24 such as a network card. Incidentally, such component units of the system are connected to one another by a bus 25, and are controlled by executing in the main control unit 21 a program (e.g., an imaging control program) stored in the storage unit 22.

Figure 4:
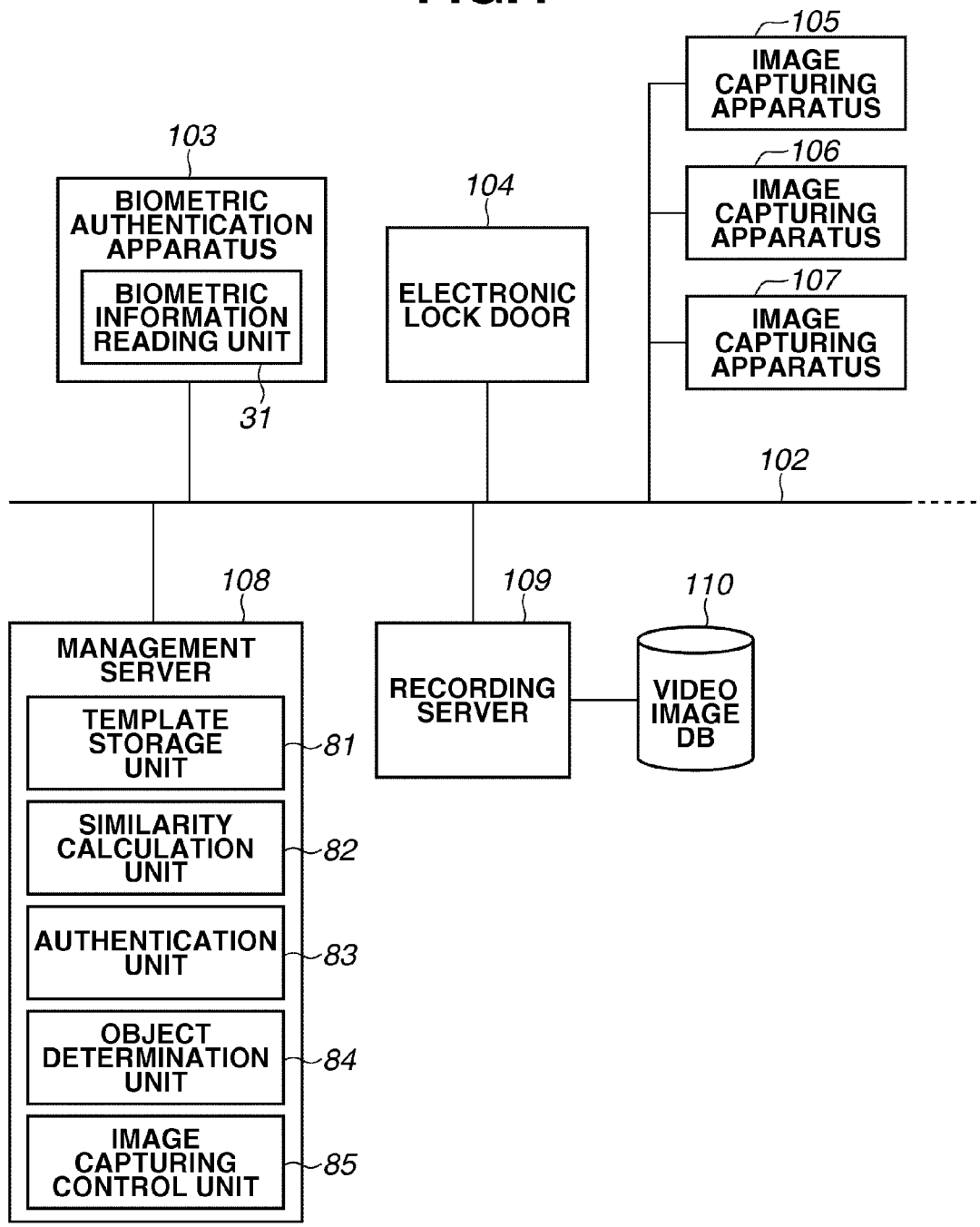
FIG. 4 illustrates an example of a functional configuration of each apparatus of the imaging processing system illustrated in FIG. 1.

Hereinafter, an example of a functional configuration of each apparatus of the imaging processing system illustrated in FIG. 1 is described with reference to FIG. 4.

The biometric authentication apparatus 103 is provided with a biometric information reading unit 31. The biometric information reading unit 31 reads biometric information of a person which is an authentication object, and sends the read biometric information to the management server 108.

The management server 108 includes a template storage unit 81, a similarity calculation unit 82, an authentication unit 83, an imaging object determination unit 84, and an image capturing control unit 85.

The template storage unit 81 stores preliminarily registered (true) biometric information as template information.

The similarity calculation unit 82 compares the biometric information read by the biometric information apparatus 103 with the template information stored in the template storage unit 81 and calculates similarity therebetween.

The authentication unit 83 performs authentication based on biometric information read from an authentication object (target) person. According to authentication by the authentication unit 83, if the similarity calculated by the similarity calculation unit 82 is higher than a preliminarily set authentication threshold, the authentication is successful.

The imaging object determination unit 84 selects persons serving as objects, on which tracking-imaging is performed by the image capturing apparatuses 105 through 107, and determines each person as an imaging object. The determination of an imaging object by the imaging object determination unit 84 is performed based on the similarity calculated by the similarity calculation unit 82 and on the authentication threshold. However, the determination is not performed in such a manner in a case where the number of imaging objects does not reach the imaging object upper limit number.

The image capturing control unit 85 controls imaging to be performed by the image capturing apparatuses 105 through 107. For example, the image capturing control unit 85 controls the image capturing apparatuses 105 through 107 such that the tracking-imaging of the imaging object determined by the imaging object determination unit 84 is performed.

In the foregoing description, the functional configuration of the imaging processing system has been described. Although the functional configurations of the biometric authentication apparatus 103 and the management server 108 have been described, it is not always necessary to implement the functional configurations of the biometric authentication apparatus 103 and the management server 108 as illustrated in the drawings. It is sufficient to implement the functional configurations of all or part of these apparatuses of the system. For example, according to the description made with reference to FIG. 4, the biometric authentication apparatus 103 performs reading of biometric information, and actual authentication is performed by the management server 108. However, authentication itself can be performed by the biometric authentication apparatus 103. In this case, the template storage unit 81, the similarity calculation unit 82, and the authentication unit 83 are implemented in the biometric authentication apparatus 103.

Figure 5:
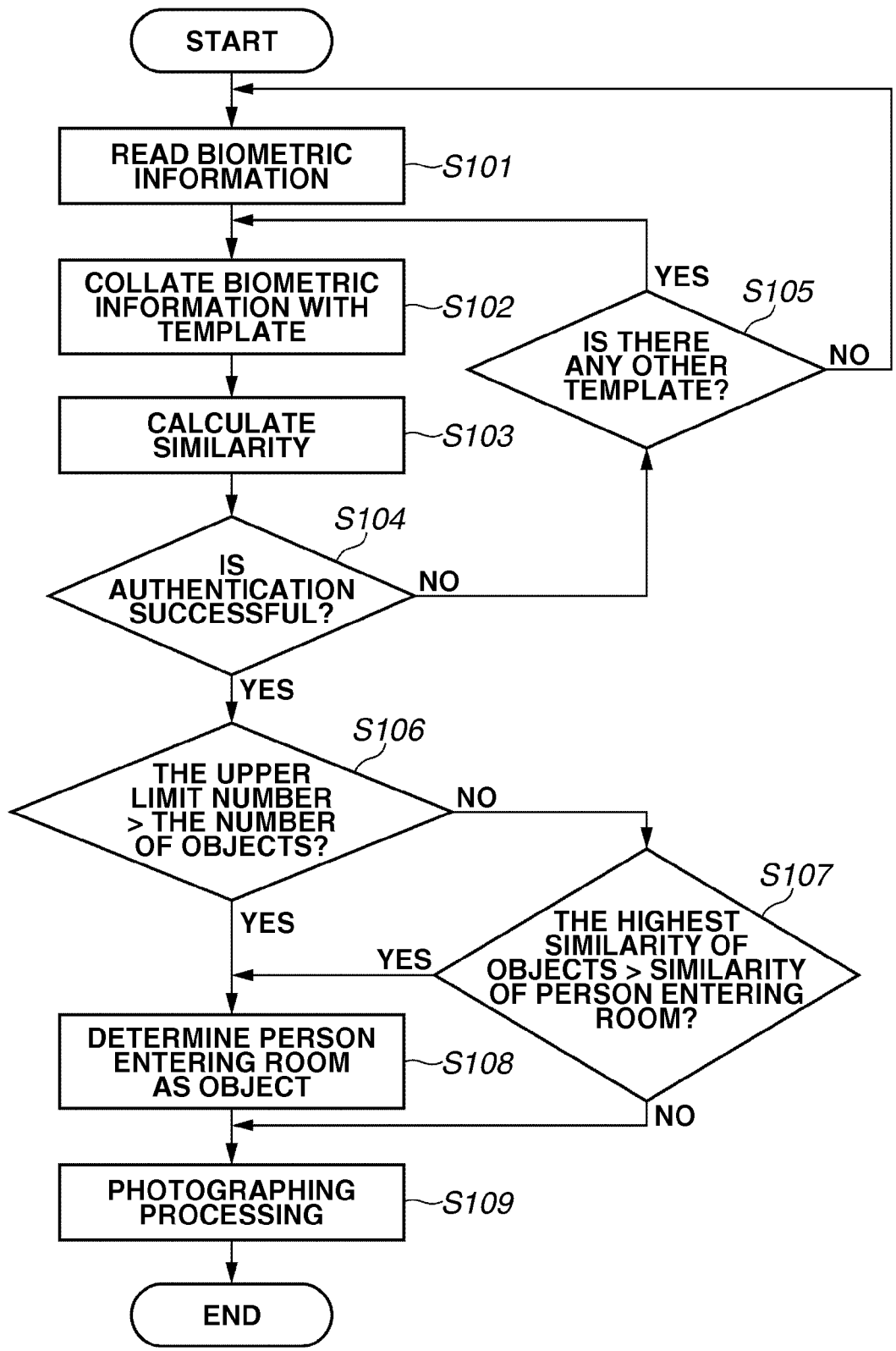
FIG. 5 illustrates an example of a flow of an operation of the imaging processing system illustrated in FIG. 1.

Next, a flow of an operation performed in the imaging processing system illustrated in FIG. 1 is described hereinafter with reference to FIG. 5. Incidentally, a flow of an operation in the case of performing authentication of a person entering the room 101 and imaging the person is described hereinbelow.

This operation is started by holding and applying a fingerprint or a cornea to the biometric authentication apparatus 103. When this operation is started, first, in step S101, the biometric information reading unit 31 of the biometric authentication apparatus 103 reads biometric information from an entry applicant and sends the read biometric information to the management server 108.

In step S102, the similarity calculation unit 82 of the management server 108 receives the biometric information and compares the received biometric information with the template information stored in the template storage unit 81. In step S103, the similarity calculation unit 82 calculates similarity therebetween. Then, in step S106, the authentication unit 83 compares the calculated similarity with the preliminarily set authentication threshold.

As a result, if the value of the similarity is equal to or larger than the threshold (YES in step S104), the authentication is successful. Then, the processing proceeds to step S106. If the value of the similarity does not reach the threshold (NO in step S104), then in step S105, the similarity calculation unit 82 determines whether there is any other template. If there is another template (YES in step S105), the processing returns to step S102. If there is no other template (NO in step S105), the processing returns to step S101.

Then, if the authentication is successful (YES in step S104), then in step S106, the imaging object determination unit 84 determines, based on the similarity calculated in this authentication processing, whether the person entering the room is a tracking-imaging object. Thus, an imaging object is determined. In this processing, first, the imaging object determination unit 84 determines whether the tracking object upper limit number is larger than the number of current imaging objects. If the tracking object upper limit number is larger than the number of current imaging objects (YES in step S106), then in step S108, the imaging object determination unit 84 determines the person entering the room is determined as an imaging object. If the tracking object upper limit number is not larger than the number of current imaging objects (NO in step S106), then in step S107, the imaging object determination unit 84 compares the highest value of similarity of the already determined imaging objects with the value of similarity of the person entering the room.

As a result of the comparison, if the value of similarity of the person entering the room is lower than the highest value of similarity of the persons already determined as the imaging objects (YES in step S107), then in step S108, the imaging object determination unit 84 determines the person entering the room as a new imaging object, instead of the person the similarity of which has the highest value.

On the other hand, if the similarity of the person entering the room is higher than or equal to the highest value of similarity of the persons already determined as the imaging objects (NO in step S107), the person entering the room is not determined as an imaging object. The members of the imaging objects are not changed. In a case where the imaging objects are determined in this manner, then in step S109, the image capturing control unit 85 controls each of the image capturing apparatuses 105 through 107 to perform tracking-imaging of the imaging objects. Incidentally, in a case where a new person entering the room appears and where authentication is performed, the steps of the aforementioned process are sequentially performed again from step S101.

Incidentally, in the foregoing description of the present embodiment, it has not been mentioned whether imaging data of an image imaged by the image capturing apparatuses 105 to 107 is recorded. Either will do. However, in the case of performing recording the imaging data, for example, a recording instruction is sent from the management server 108 to the recording server 109 together with the imaging data of images imaged by the image capturing apparatuses 105 to 107. Thus, the recording of the imaging data is performed.

Figure 6:
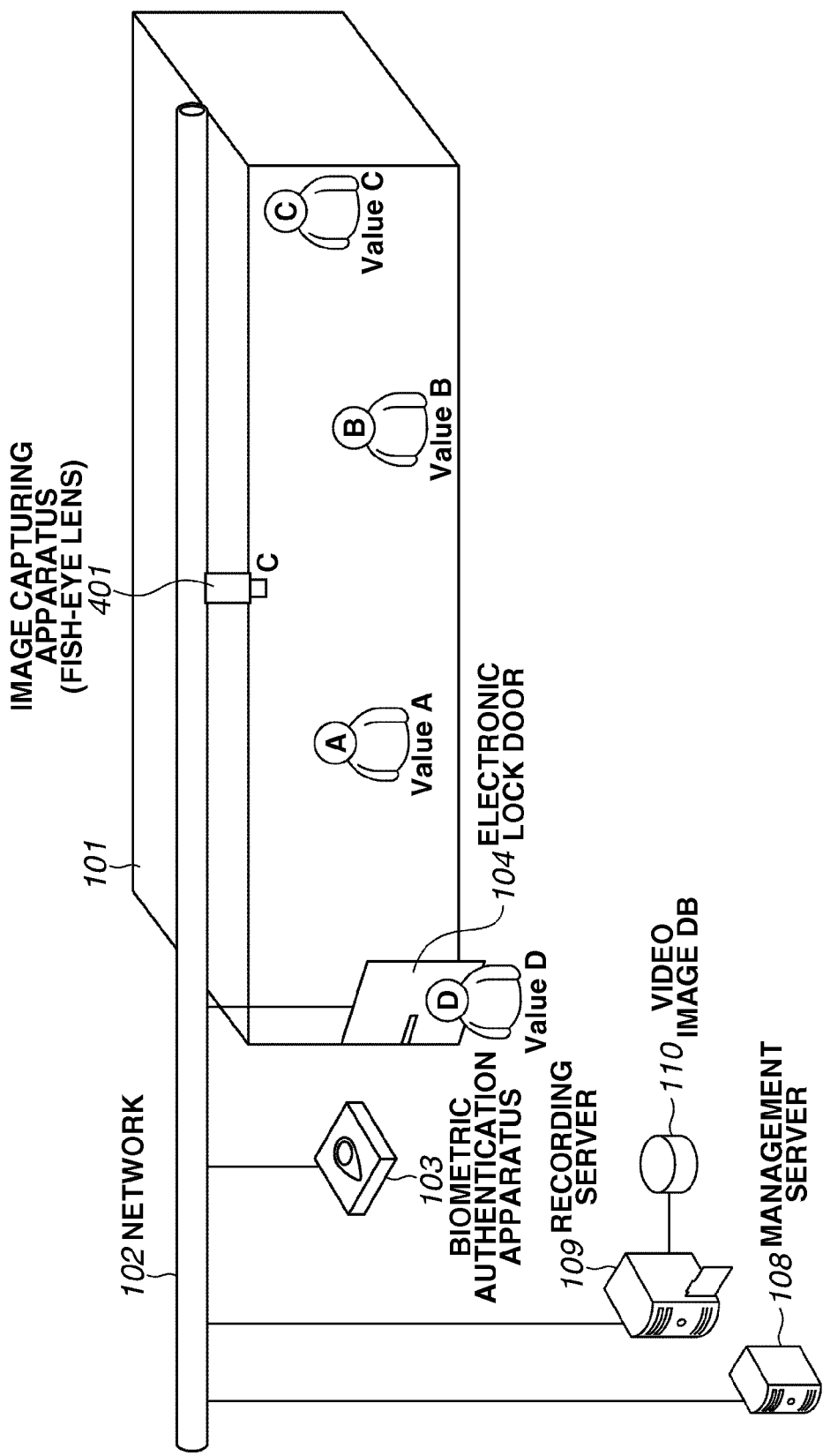
FIG. 6 illustrates an example of the configuration of an imaging processing system according to a second exemplary embodiment of the present invention.

FIG. 6 illustrates an example of the configuration of an imaging processing system according to a second exemplary embodiment of the present invention. Incidentally, components designated with like reference numerals shown in FIG. 1 are similar to those which are designated with such reference numerals and are provided in the first exemplary embodiment. Thus, descriptions of such components are not repeated herein.

In a room 101, a biometric authentication apparatus 103, an electronic lock door 104, an image capturing apparatus 401, a management server 108, a recording server 109, a video image DB 110, and the like are connected to one another via a network 102 such as a LAN.

Similar to the first exemplary embodiment, it is sufficient that the management server 108, the recording server 109, and the video image DB 110 are connected to be communicatable with one another. The management server 108, the recording server 109, and the video image DB 110 can be installed either outside or inside the room 101. Additionally, a connection configuration of the components is not limited to a specific one.

The image capturing apparatus 401 is provided with a fish-eye lens. A plurality of persons can be imaged by the single image capturing apparatus 401. Incidentally, in the following description of the present embodiment, a case of installing only one image capturing apparatus provided with a fish-eye lens therein is described by way of example. However, a plurality of image capturing apparatuses 401 can be installed in the present embodiment.

Persons A, B, and C are in the room 101. A value of similarity calculated at the authentication corresponding to the person A is "Value A". That of similarity calculated at the authentication corresponding to the person B is "Value B". That of similarity calculated at the authentication corresponding to the person C is "Value C". These values of similarity have the following relationship: "Value A"<"Value B"<"Value C". That is, the value of similarity of the person C is highest among these values thereof, while that of similarity of the person A is lowest thereamong. Incidentally, a value of similarity of a person is calculated based on a result of comparing biometric information read in the authentication performed at the entry of the person into the room with template information.

In the present embodiment, whether to perform recording is determined according to the calculated similarity. More specifically, first, the similarity calculated at authentication is compared with the preliminarily registered threshold (hereinafter referred to as a recording threshold). Then, in a case where the value of the similarity is less than the recording threshold, recording is performed. Otherwise, recording is not performed. In the present embodiment, the recording threshold is assumed to be "Value N". For example, in a case where the similarity and the recording threshold having the following relationship: "Value N"<"Value A"<"Value B"<"Value C", there is no person the value of the similarity of which is lower than the recording threshold. Thus, recording processing is not performed.

When a person D tries to enter the room 101, authentication is performed. Then, the person D authenticates himself by holding and applying his fingerprint or cornea to the biometric authentication apparatus 103. Thus, biometric information of the person D is read by the biometric authentication apparatus 103. Then, authentication is performed using the read biometric information and template information. If the similarity between the biometric information and the template information exceeds the authentication threshold, the authentication is successful. Otherwise, the authentication is failed. In a case where the authentication is successful, it is determined according to the calculated value "Value D" of the similarity whether the person D is a recording object whose image is to be recorded.

If the value of the similarity is less than the recording threshold, recording is performed. Imaging data is accumulated in the video image DB 110 by the recording server 109. At that time, the recording is performed at an image quality and a frame rate, which are set at the recording. For example, in a case where the values of the similarity meet the following relationship: "Value D"<"Value N", tracking-imaging of the personal D is performed. Thus, the recording is performed.

Figure 7:
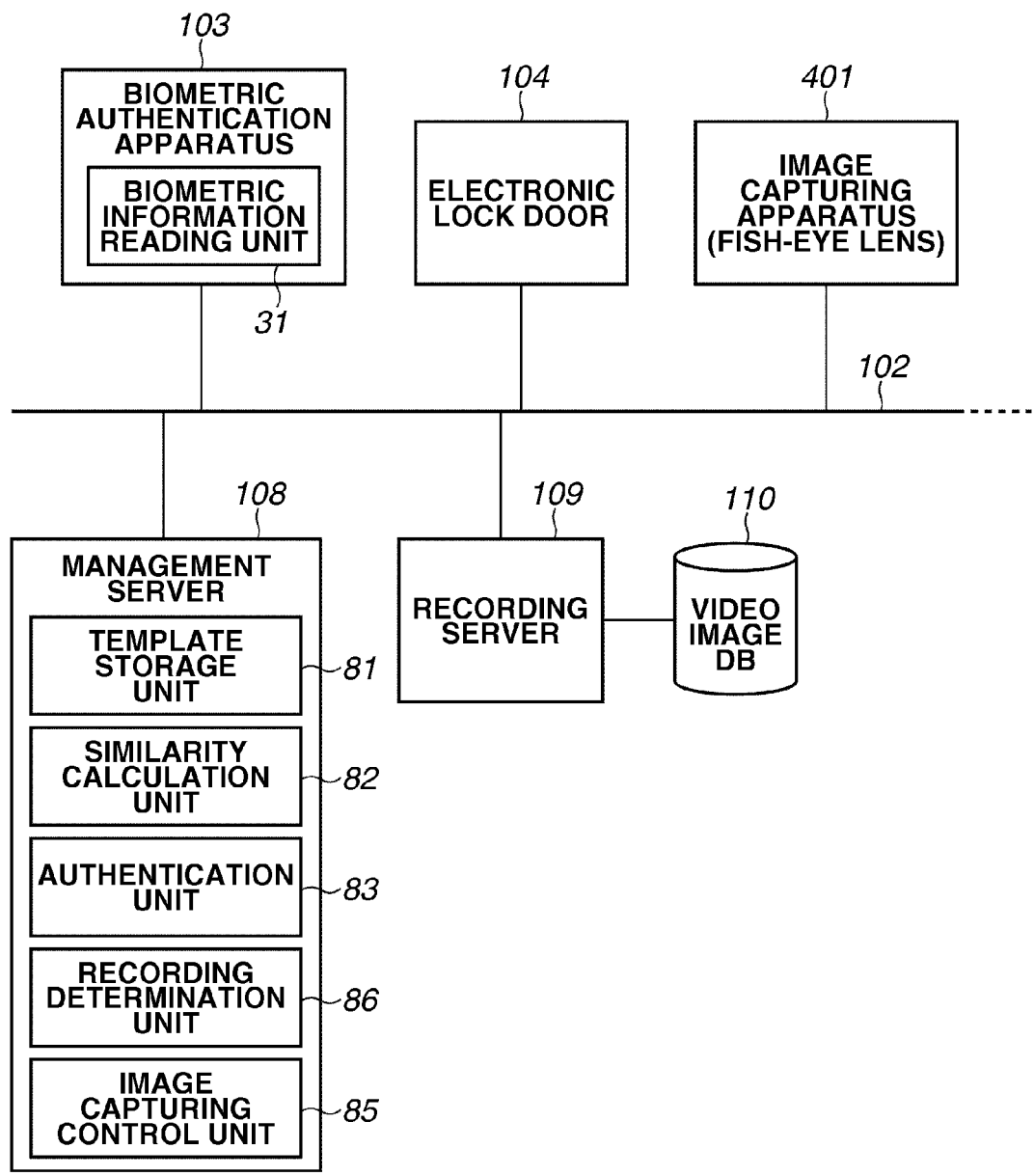
FIG. 7 illustrates an example of a functional configuration of each apparatus of the imaging processing system according to the second exemplary embodiment of the present invention.

Hereinafter, an example of a functional configuration of each apparatus of the imaging processing system according to the second exemplary embodiment is described with reference to FIG. 7. Incidentally, functional components designated with like reference numerals used to denote like functional components of the first exemplary embodiment illustrated in FIG. 4 are similar to those of the first exemplary embodiment. Thus, descriptions of such functional components are not repeated.

The management server 108 includes a template storage unit 81, a similarity calculation unit 82, an authentication unit 83, an image capturing control unit 85, and a recording determination unit 86. That is, the imaging object determination unit 84 is removed from the configuration of the first exemplary embodiment illustrated in FIG. 4. The recording determination unit 86 is newly added thereto.

The recording determination unit 86 determines whether imaging data of images imaged by the image capturing apparatuses 105 through 107 is to be recorded. That is, it is determined according to a result of determination made by the recording determination unit 86 whether recording is to be performed by the recording server 109. Incidentally, it is determined by the recording determination unit 86 according to the value of the similarity calculated by the similarity calculation unit 82 and to a value of recording similarity whether the recording is to be performed.

Although the functional configurations of the biometric authentication apparatus 103 and the management server 108 have been described, it is not always necessary to implement the functional configurations of the biometric authentication apparatus 103 and the management server 108 as illustrated in the drawings. It is sufficient to implement the functional configurations of all or part of these apparatuses of the system. Similar to the first exemplary embodiment, e.g., the template storage unit 81, the similarity calculation unit 82, and the authentication unit 83 can be implemented in the biometric authentication apparatus 103.

Figure 8:
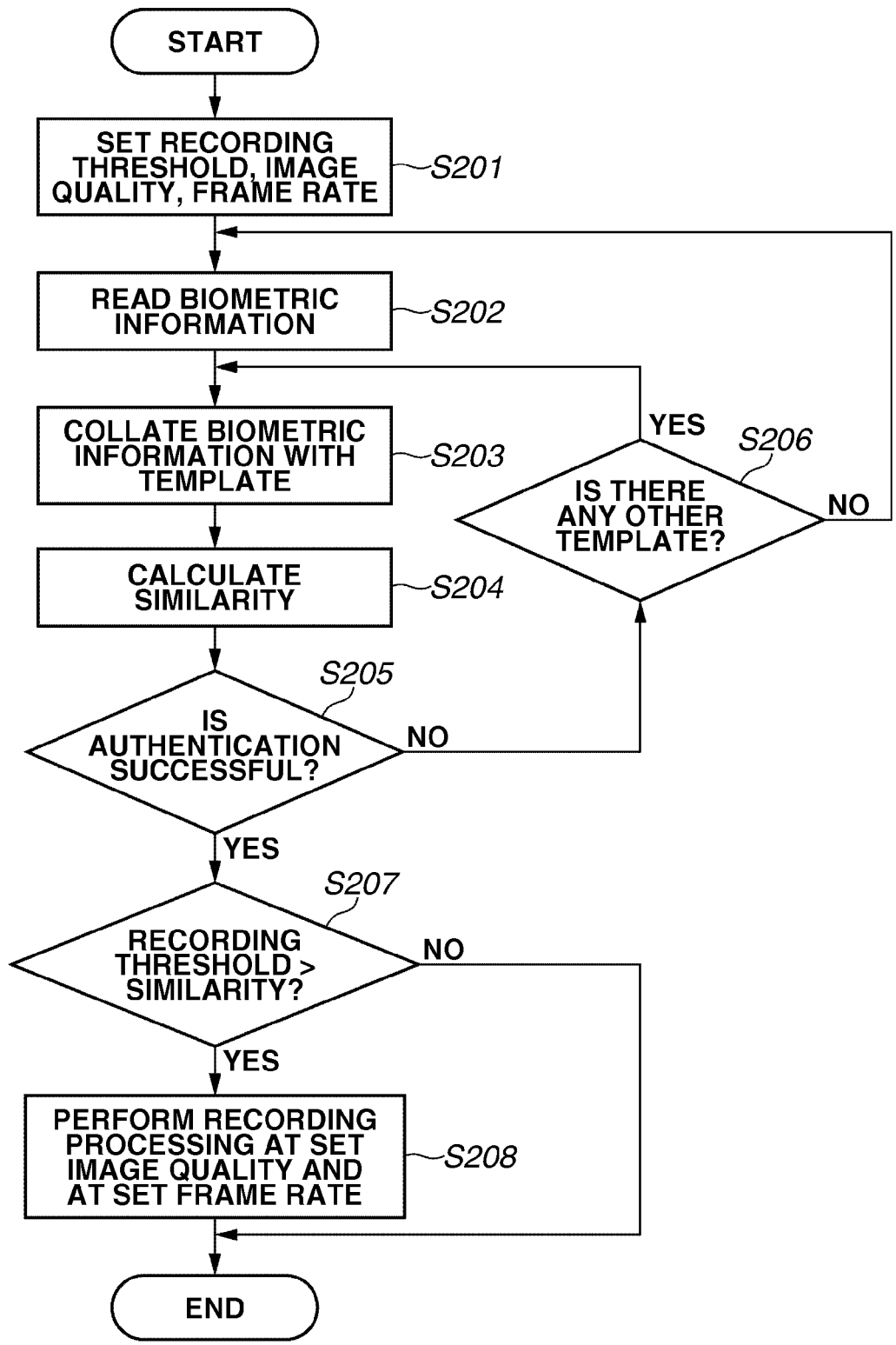
FIG. 8 illustrates an example of a flow of an operation of the imaging processing system according to the second exemplary embodiment of the present invention.
Figure 9:
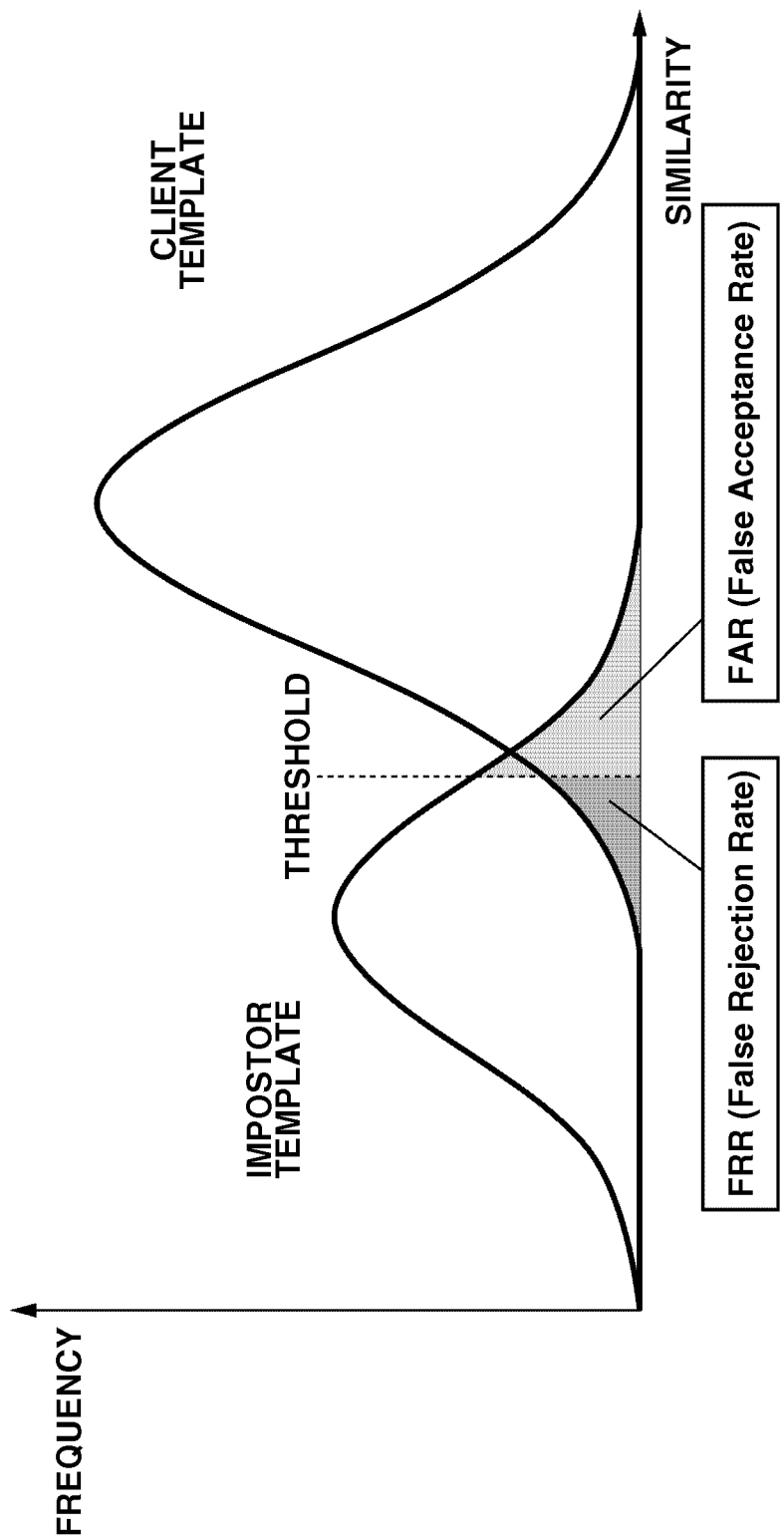
FIG. 9 illustrates the relationship between the FAR and the FRR in biometric authentication.

Next, a flow of an operation performed in the imaging processing system according to the second exemplary embodiment is described hereinafter with reference to FIG. 8. Incidentally, a flow of an operation in the case of performing authentication of a person entering the room 101 and imaging the person is described hereinbelow.

When this operation is started, first, in step S201, the management server 108 sets a recording threshold, an image quality, and a frame rate. Then, when an entry applicant holds and applies a fingerprint or a cornea representing biometric information to the biometric authentication apparatus 103, then in step S202, the biometric information reading unit 31 reads biometric information from the entry applicant and sends the read biometric information to the management server 108.

In step S203, the similarity calculation unit 82 of the management server 108 receives the biometric information and compares the received biometric information with the template information stored in the template storage unit 81. In step S204, the similarity calculation unit 82 calculates similarity therebetween. Then, in step S205, the authentication unit 83 compares the calculated similarity with the preliminarily set authentication threshold.

As a result, if the value of the similarity is equal to or larger than the threshold (YES in step S205), the authentication is successful. Then, the processing proceeds to step S207. If the value of the similarity does not reach the threshold (NO in step S205), then in step S206, the similarity calculation unit 82 determines whether there is any other template. If there is another template (YES in step S206), the processing returns to step S203. If there is no other template (NO in step S206), the processing returns to step S202.

Then, if the authentication is successful (YES in step S205), then in step S207, the recording determination unit 86 determines, based on the similarity calculated in the authentication processing, whether the person entering the room is a recording object whose image is to be recorded. In this operation, the recording determination unit 86 compares the recording threshold set in step S201 with the similarity calculated in step S204. If this similarity is less than the recording threshold (YES in step S207), then in step S208, the recording determination unit 86 records a video image, which is imaged by the image capturing apparatus 401, on the recording server 109. At that time, the imaging data is recorded at the image quality and the frame rate which are set in step S201.

On the other hand, if the similarity is equal to or greater than the recording threshold (NO in step S207), recording of an image of this person entering the room is not performed. This operation is directly finished. Incidentally, the image quality of the image represented by the imaging data and the frame rate can be adjusted by performing imaging based on information such information using the image capturing apparatus 401. Alternatively, the image quality and the frame rate can be adjusted by processing imaging data in the recording server 109 based on such information. In the former case, information representing the image quality and the frame rate is sent from the management server 108 to the image capturing apparatus 401. In the latter case, the information representing the image quality and the frame rate is sent from the management server 108 to the recording server 109.

Incidentally, the fish-eye lens can be mounted in each of the image capturing apparatuses according to the first exemplary embodiment.

Although the image quality of the image represented by the imaging data and the frame rate are first set and are constant in the second exemplary embodiment, the image quality and the frame rate according to the present invention are not limited thereto. At least one of the image quality of the image represented by the imaging data, the frame rate and a recording time can be changed based on the similarity of the person entering the room. Further, a control operation is performed such that the lower the similarity, the image quality and the frame rate are enhanced and the recording time is increased.

Figure 10:
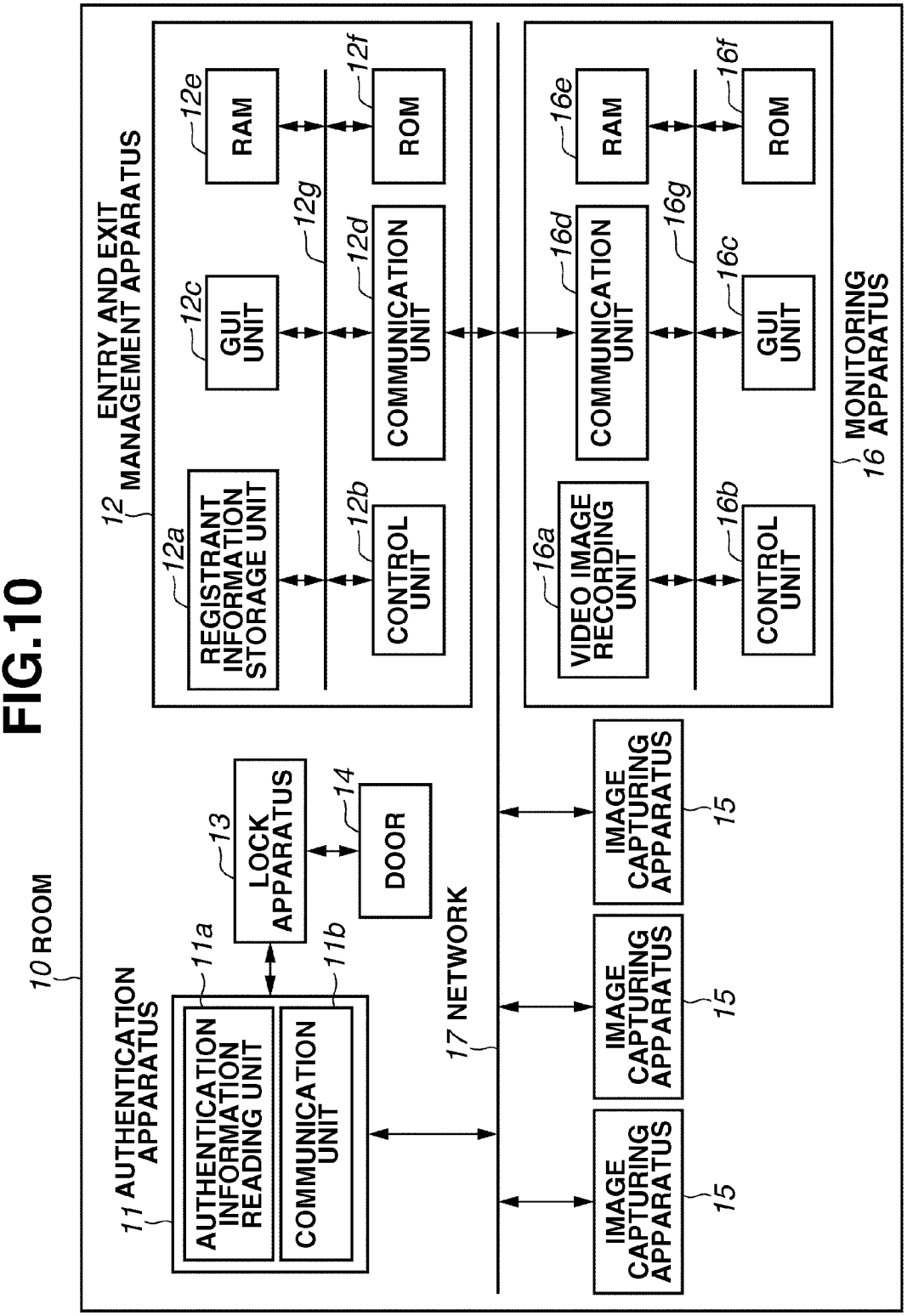
FIG. 10 illustrates a system configuration of an entry and exit management system according to a third exemplary embodiment of the present invention.

FIG. 10 illustrates a system configuration of an entry and exit management system according to a third exemplary embodiment of the present invention.

As illustrated in FIG. 10, the entry and exit management system according to the present embodiment includes an authentication apparatus 11, an entry and exit management apparatus 12, a lock apparatus 13, a door 14, an image capturing apparatus 15, and a monitoring apparatus 16, which are provided in a room 10. These component apparatuses are connected via a network 17 to be communicatable with one another.

The authentication apparatus 11 includes an authentication information reading unit 11a and a communication unit 11b. The authentication apparatus 11 performs authentication of a user entering the room. 10 and specifies the user according to a result of the authentication. The authentication apparatus 11 is constructed so that in a case where authentication is successful, information indicating success of the authentication is sent to each component apparatus of the system via the communication unit 11b. For example, a method for reading identification information recorded on an identification (ID) card by holding an ID card up to an ID card reader can be employed as an authentication method according to the present embodiment. Alternatively, a method for inputting biometric information, which is obtained from, e.g., a fingerprint, a vein, or a face, as identification information, or a method for inputting a password as identification information can be employed as an authentication method according to the present embodiment. The system can be implemented by employing any other authentication method.

The entry and exit management apparatus 12 includes a registrant information storage unit 12a, a control unit 12b, a graphical user interface (GUI) 12c, a communication unit 12d, a RAM 12e, and a ROM 12f, and a bus 12g, which connects such components.

Figure 15:
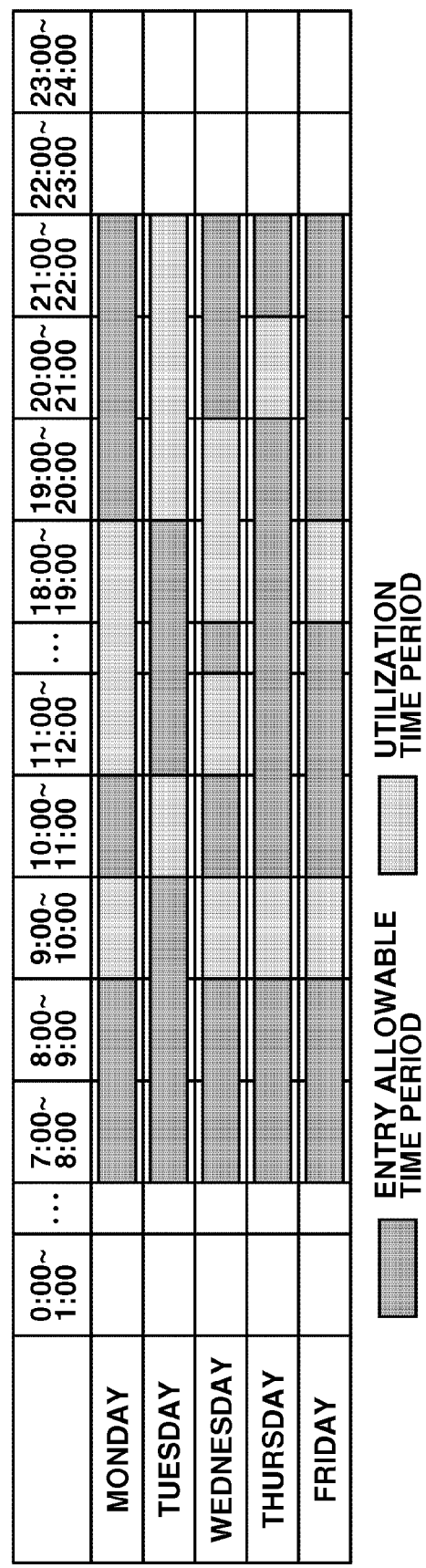
FIG. 15 illustrates an example of information concerning the relationship between entry allowable time periods and utilization time periods of a user, which is employed in the entry and exit management system according to the third exemplary embodiment of the present invention.

The registrant information storage unit 12a stores a user ID, user notification information such as a user mail address, user identification information, information on an entry allowable time period corresponding to each user illustrated in FIG. 12, and information on a history of utilization and a utilization time, which correspond to each user as illustrated in FIG. 13. Information representing an entry allowable time period is added when a user is permitted to enter a certain room. In a time period represented by this information, if a user is authenticated by the authentication apparatus 11, the user is permitted to enter the room. The registrant information storage unit 12a stores also information on a utilization time period determined according to a utilization time and to a history of utilization, and the relationship between the utilization time period and the entry allowable time period as illustrated in FIG. 15. The utilization time period is a time period, in which the room is frequently used, in the entry allowable time period. In a case where the number of times of entries into the room (entry frequency) per unit time period in a predetermined past time period, which is acquired from the history of utilization according to the present embodiment, is equal to or higher than the predetermined number of times, this time period is employed as the utilization time period. More specifically, in a case where the number of times of entries into the room per unit time period is equal to or more than 2 in a predetermined time period, the time period is determined as the utilization time period. Other methods and criteria can be employed to determine the utilization time period.

Hereinafter, information stored in the registrant information storage unit 12a is described. FIG. 12 illustrates an example of an entry allowable time period corresponding to each user. In this example, an entry allowable time period of a user A corresponding to each day of week is illustrated. More specifically, FIG. 12 indicates that the user A is permitted to enter the room from "7:00 through 22:00" each of Monday through Friday.

FIG. 13 illustrates an example of information concerning a history of utilization and a utilization time of each user. In this example, a history of utilization by a user A on Monday, and a utilization time of the user A every utilization are illustrated. Such information is sequentially stored and accumulated in the registrant information storage unit 12a every time the user enters the room.

Figure 14:
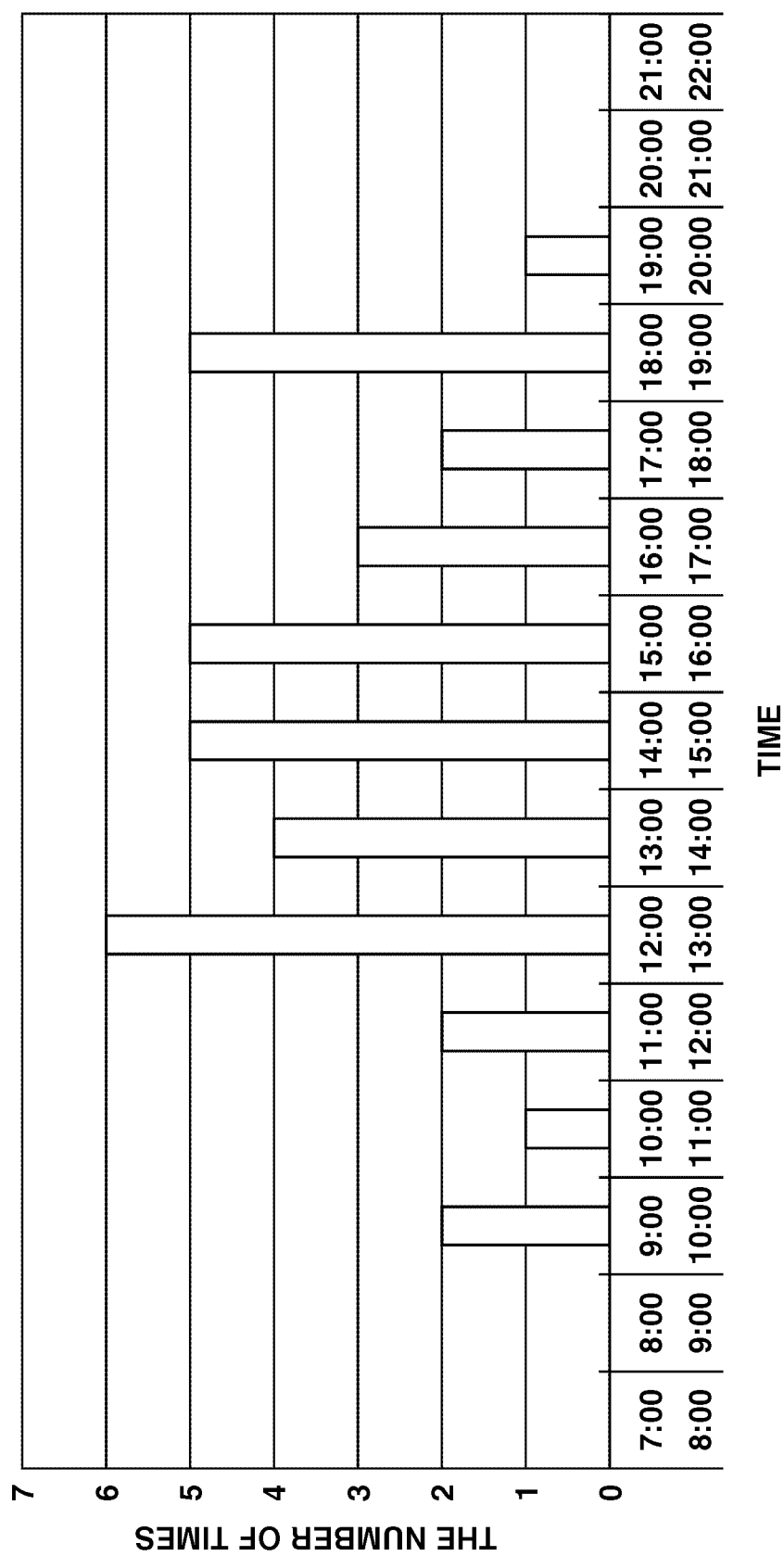
FIG. 14 illustrates a history of (or the number of times of) entries by a user into a room, which is employed in the entry and exit management system according to the third exemplary embodiment of the present invention.

FIG. 14 illustrates a history of (or the number of times of) entries by a user into a room at a predetermined day of week, which is calculated based on the history of utilization illustrated in FIG. 13. In this example, the number of times of entries by the user A into the room per unit time period on Monday is illustrated. A time period, in which the number of times of using the room by the user A is equal to or more than 2, is determined as the utilization time period of the user A on Monday. Such information is also stored in the registrant information storage unit 12a.

FIG. 15 illustrates an example of information concerning the relationship between entry allowable time periods and utilization time periods of a user. In this example, the relationship among the entry allowable time period and the utilization time period of the user A on each day of week is illustrated. More specifically, e.g., on Monday, a time period from "9:00 to 10:00" and a time period from "11:00 to 19:00" are determined as the utilization time periods. Such information is stored in the registrant information storage unit 12a in such a manner as to be able to be discriminated from the entry allowable time period.

Figure 16:
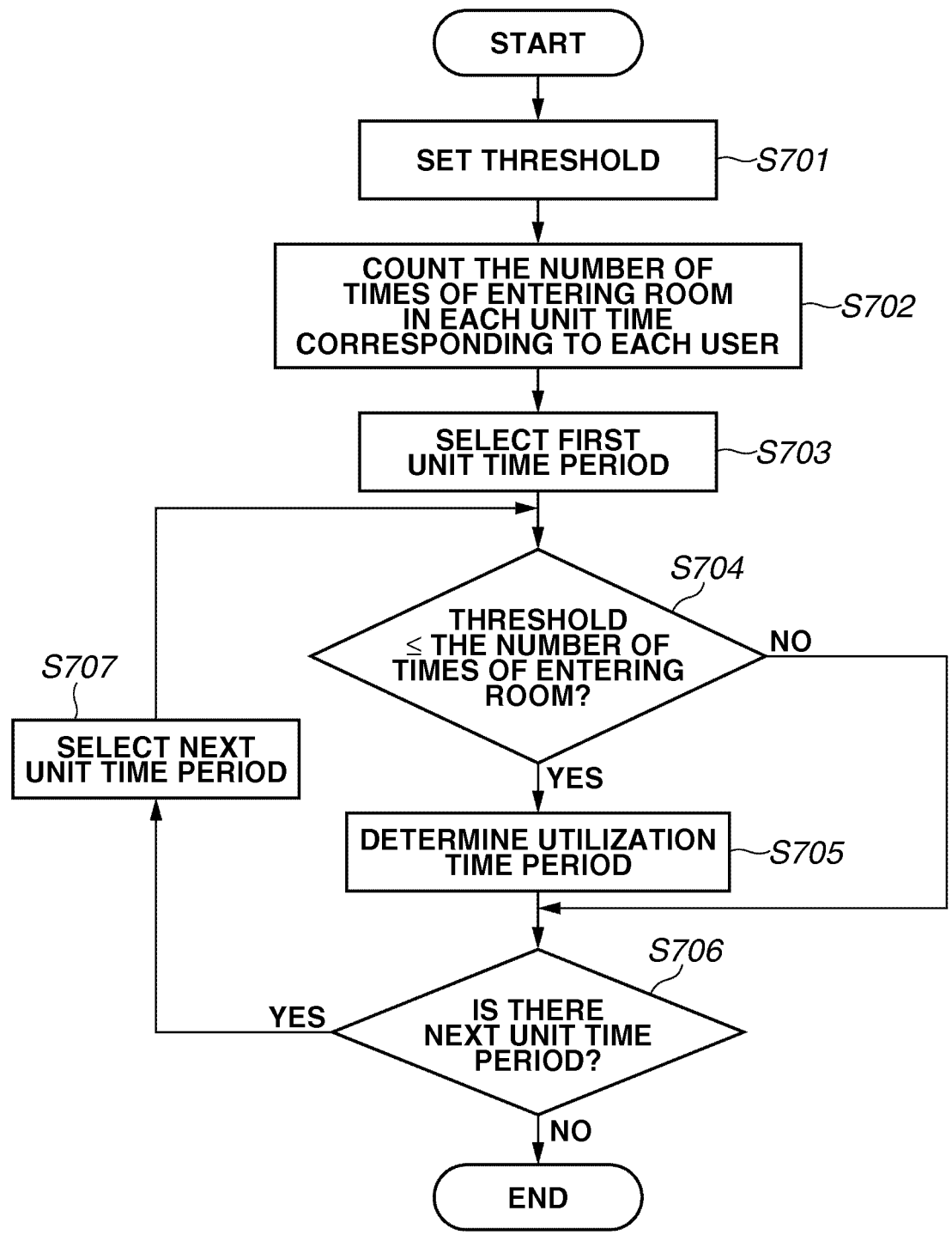
FIG. 16 illustrates an example of a flow of an operation of the entry and exit management system according to the third exemplary embodiment of the present invention in the case of calculating the utilization time periods.

Next, a method for calculating the utilization time period is described hereinafter with reference to FIG. 16. FIG. 16 illustrates an example of a flow of an operation of the control unit 12b in the case of calculating the utilization time periods using a CPU (not shown) and a program to be executed thereon.

First, in step S701, the control unit 12b records in the registrant information storage unit 12a a threshold for the number of times of entries per unit time period, which is input from the GUI unit 12c by an administrator of the entry and exit management system.

Next, in step S702, the control unit 12b counts the number of times of entries per unit time period corresponding to each user based on information representing the history of utilization and the utilization time stored in the registrant information storage unit 12a. Then, the control unit 12b records the counted number of times of entries per unit time period corresponding to each user in the registrant information storage unit 12a.

Next, in step S703, the control unit 12b selects the first unit time period (e.g., a time period from "7:00 to 8:00") in the entry allowable time period set corresponding to each user.

Next, in step S704, the control unit 12b compares the number of times of entries in the unit time period selected in step S703 with the threshold recorded in step S701. If the number of times of entries in the unit time period is equal to or more than the threshold (YES in step S704), the operation proceeds to step S705. If the number of times of entries in the unit time period is less than the threshold (NO in step S704), the operation proceeds to step S706.

In step S705, the control unit 12b records in the registrant information storage unit 12a information indicating that the selected unit time period is a utilization time period. Then, the control unit 12b proceeds to step S706.

In step S706, the control unit 12b determines whether there is any unit time period to be next selected. If there is the next unit time period (YES in step S706), the operation proceeds to step S707, in which the control unit 12b selects the next unit time period. Then, the operation returns to step S704. If there is not the next unit time period (NO in step S706), the control unit 12b finishes the operation of determining a utilization time period. Thus, according to the present embodiment, the utilization time period corresponding to each user (imaging object) is determined.

Referring back to FIG. 10, in addition to the operation illustrated in FIG. 16, the control unit 12b determines whether the entry time of each user is included in the utilization time period thereof. If the entry time of a user is not included in the utilization time period thereof, the control unit 12b performs also an operation of sending the monitoring apparatus 16 an instruction to track this user and to record an image thereof via the communication unit 12d. This operation is described in detail below. The GUI unit 12c is an interface to be used by the observer of the entry and exit management system to operate the system. The GUI unit 12c outputs information input from the observer to the bus 12g. The communication unit 12d outputs information to the monitoring apparatus 16 via the network 17.

The RAM 12e is a semiconductor memory from and to which information can be read and written by addressing a given storage location. An application program for the entry and exit management apparatus 12 is installed in the RAM 12e. The RAM 12e temporarily stores data needed for processing performed in the entry and exit management apparatus 12, and outputs such data to the bus 12g, if necessary. The ROM 12f is a read-only memory that stores control programs needed for processing performed in the control unit 12b. The control unit 12b reads a necessary program from the ROM 12f at a predetermined timing and outputs the read program to the bus 12g. Incidentally, the control unit 12b performs arithmetic processing itself based on the application program stored in the RAM 12e and controls each component included in and the entirety of the above-described entry and exit management apparatus 12.

The lock apparatus 13 receives an instruction from the authentication apparatus 11 and unlocks and locks the electronic lock door 14. The image capturing apparatus 15 performs predetermined processing based on an instruction output from the monitoring apparatus 16. In the present embodiment, a plurality of image capturing apparatuses 15 is provided therein. However, the number of image capturing apparatuses 15 provided in the system can be 1. Each of the image capturing apparatuses 15 has a pan/tilt drive mechanism and a zoom mechanism.

The monitoring apparatus 16 includes a video image recording unit 16a, a control unit 16b, a GUI unit 16c, a communication unit 16d, a RAM 16e, a ROM 16f, and a bus 16g for connecting such components to one another.

The video image recording unit 16a records a video image imaged by the image capturing apparatus 15. The control unit 16b receives an instruction for managing recording data, which is input by an administrator using the GUI unit 16c. The control unit 16b causes the image capturing apparatus 15 in accordance with the instruction received from the entry and exit management apparatus 12 via the communication unit 16d to track a user and to perform recording of an image of the user.

The RAM 16e is a semiconductor memory from and to which information can be read and written by addressing a given storage location. An application program for the monitoring apparatus 16 is installed in the RAM 16e. The RAM 16e temporarily stores data needed for processing performed in the monitoring apparatus 16, and outputs such data to the bus 12g, if necessary. The ROM 16f is a read-only memory that stores control programs needed for processing performed in the control unit 16b. The control unit 16b reads a necessary program from the ROM 16f at a predetermined timing and outputs the read program to the bus 16g. Incidentally, the control unit 16b performs arithmetic processing itself based on the application program stored in the RAM 16e and controls each component included in and the entirety of the monitoring apparatus 16.

The network 17 is assumed in the present embodiment to use a transmission control protocol/Internet protocol (TCP/IP protocol). Thus, the entry and exit management system can be used in any of the Internet and the LAN. However, a communication protocol, according to which devices of the network according to the present embodiment exchange information, is not limited to TCP/IP protocol. For example, Internet packet exchange/Internet service exchange (IPX/ISX) protocol, and Apple Talk, which have similar functions, can be used instead of TCP/IP protocol. As long as these protocols can be used, any type of circuits, such as wire circuits and radio circuits, can be used. Incidentally, as long as the entry and exit management apparatus 12 and the monitoring apparatus 16 are connected to each other by a LAN or the like, the entry and exit management apparatus 12 and the monitoring apparatus 16 can be installed either inside or outside the room 10.

Figure 11:
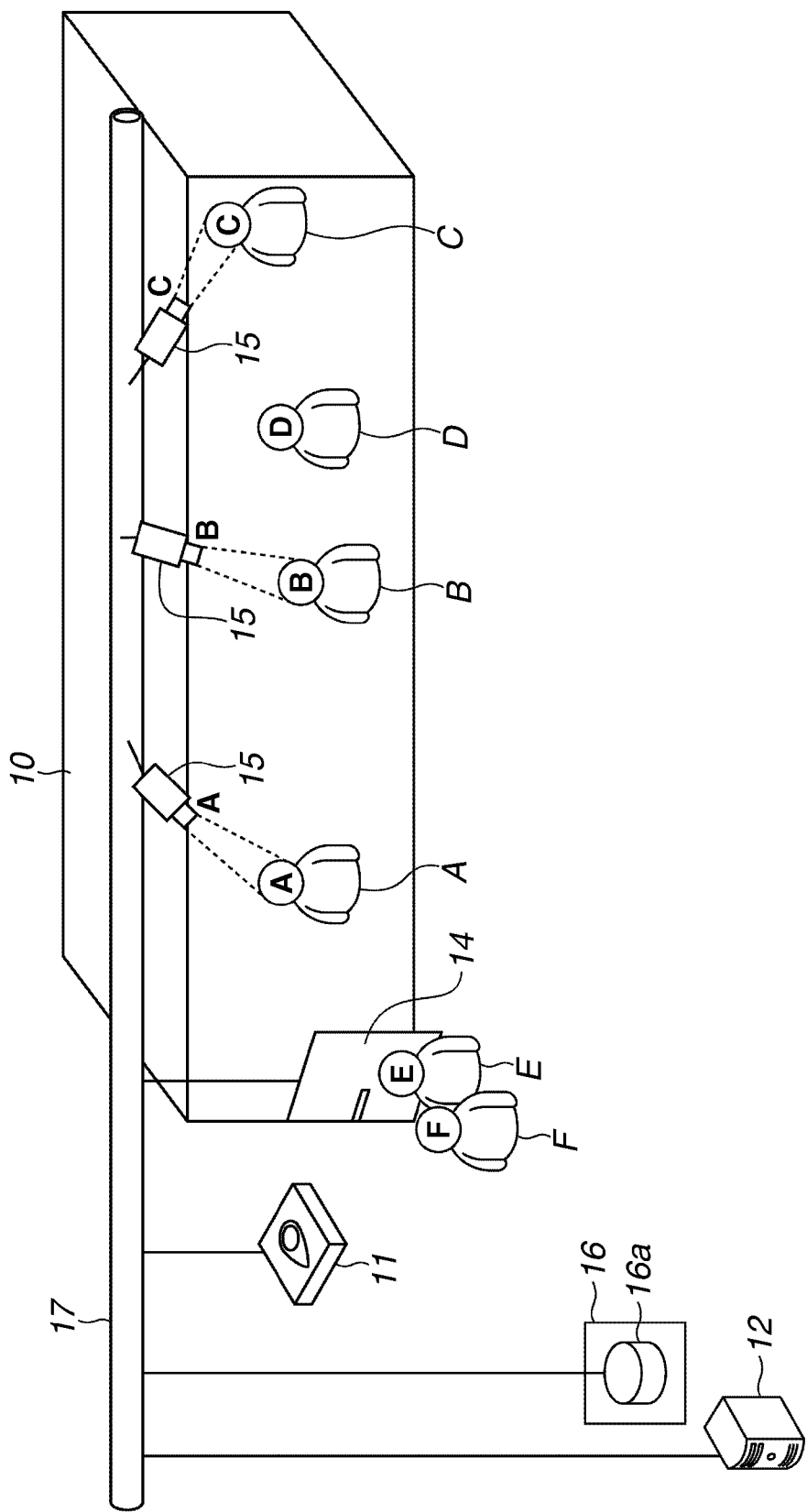
FIG. 11 schematically illustrates a configuration of the entry and exit management system according to the third exemplary embodiment of the present invention.

FIG. 11 schematically illustrates a configuration of the entry and exit management system according to the present embodiment. FIG. 11 illustrates the room 10, the authentication apparatus 11, the entry and exit management apparatus 12, the door 14, three image capturing apparatuses 15, the monitoring apparatus 16 (including the video image recording unit 16a), and the network 17. In addition, users A through D, who are in the room 10, and users E and F, who are going to enter the room 10 by being successfully authenticated, are illustrated in FIG. 11. More specifically, the entry and exit management system according to the present embodiment is applied to a closed area (the room 10 in this case), in which an image can be imaged using the image capturing apparatus 15.

In the entry and exit management system according to the present embodiment, in a case where the entry time of a user is not included in the utilization time period thereof, tracking-imaging or recording-imaging of the user is performed using the image capturing apparatuses 15. At tracking or recording, the image capturing apparatuses 15 are respectively assigned to the users in a one-to-one correspondence manner. In a case where a plurality of users associated with the same group enters the room simultaneously or within a predetermined time period, and where the entry time of each of the users is included within the utilization time period of at least one of the users, all the other users associated with the same group, who enter the room simultaneously or within a predetermined time period, are not tracking objects. The term "group" means, e.g., a department in a company. Information representing a group of users is preliminarily stored in the registrant information storage unit 12a of the entry and exit management apparatus 2. Hereinafter, a tracking/recording management table, which is used in the entry and exit management system according to the present embodiment when tracking of a user or recording of an image of a user is performed, is described.

FIG. 17 illustrates an example of each of an entry time corresponding to each user, a utilization time period corresponding to each user, and a tracking/recording management table employed in the entry and exit management apparatus 12. In this example, a state shown in FIG. 11, i.e., a state, in which the users A through D are in the room 10 and in which the users E and F have been successfully authenticated and entered the room 10, is illustrated. The entry time 801 described in FIG. 17 is information stored in the registrant information storage unit 12a in a case where authentication performed by the authentication apparatus 11 is successful. The utilization time period 802 is preliminarily determined, as described above, and is stored in the registrant information storage unit 12a. The tracking/recording management table 803 is a table used when the control unit 12b of the entry and exit management apparatus 12 controls whether to track and record the user entering the room with the image capturing apparatus 15.

In the tracking/recording management table 803, data representing the time difference between the entry time of each user and the utilization time period is stored in a column 803a representing a time difference. Flags for determining whether tracking of the user entering the room or recording of an image of the user entering the room is performed are set in a column 803b representing a tracking flag. More specifically, in a case where the entry time of a user is not included in the utilization time period of the user, the flag is set to "True", so that the user is determined as a tracking object. In a case where the entry time of a user is included in the utilization time period of the user, the flag is set to "False", so that the user is not determined to be a tracking object. A time elapsed since the start of tracking-imaging is recorded in a column 803c representing a tracking time.

In this example, as indicated in the tracking/recording management table 803, the users A through C the entry time of each of which is not included in the utilization time period thereof, are determined as tracking objects. Thus, as illustrated in FIG. 11, the image capturing apparatuses 15 are directed to the users A through C, respectively (see dashed lines illustrated in FIG. 11). Meanwhile, the user F, the entry time of each of which is not included in the utilization time period thereof, enters the room simultaneously with the user E, the entry time of each of which is included in the utilization time period thereof. In addition, the users E and F belong to the same group. Therefore, the users E and F are not tracing objects. Incidentally, in a case where the users E and F do not belong to the same group, the user F can be a tracking object. In the present embodiment, the number of image capturing apparatuses 15 is limited. Accordingly, the tracking of the user A, the tracking time corresponding to which is longest, is cancelled. Then, the image capturing apparatus 15 used for tracking of the user A is assigned to the user F.

Figure 18:
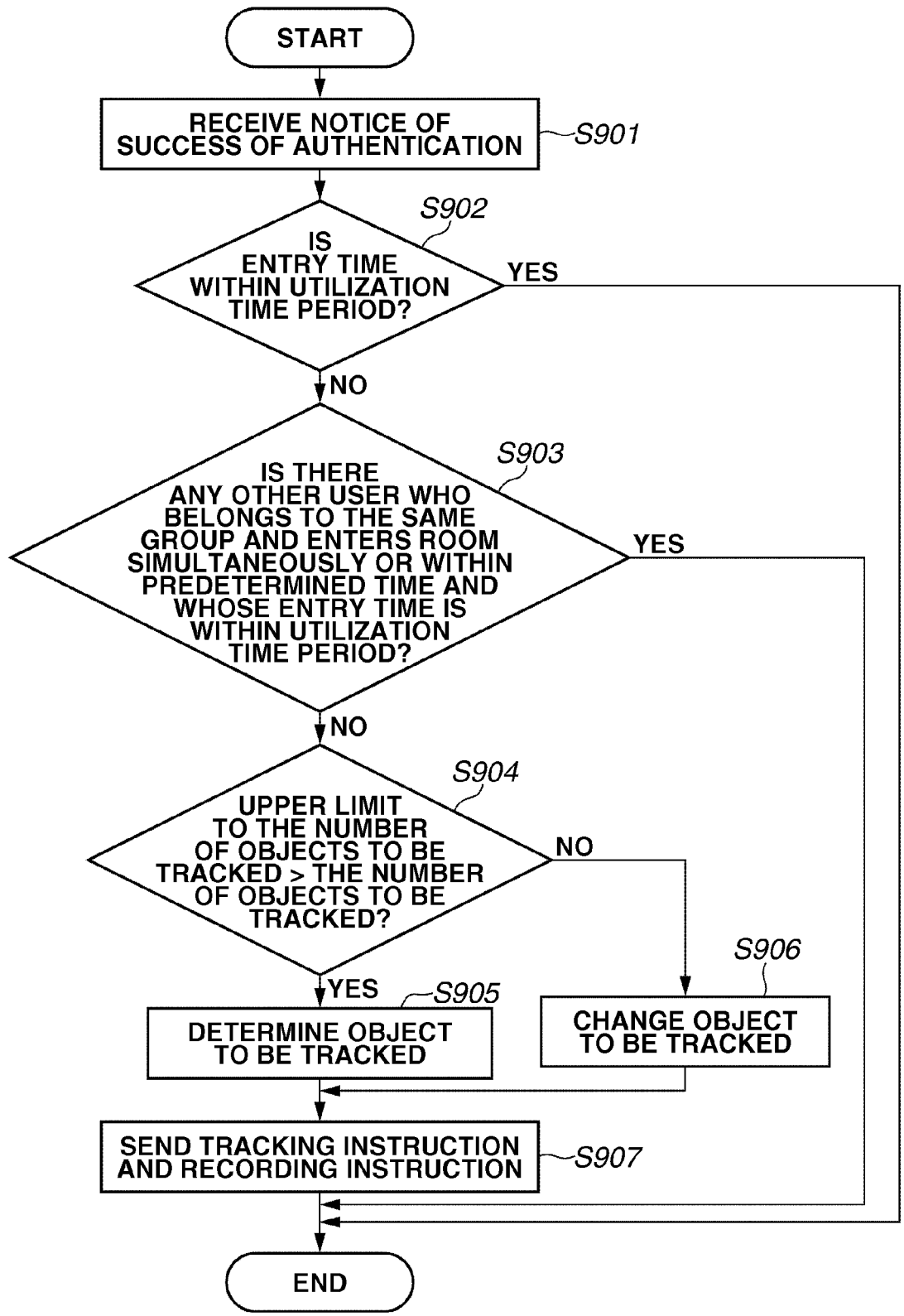
FIG. 18 illustrates a flow of an operation of the entry and exit management system according to the third exemplary embodiment of the present invention in the case of determining a tracking object.

Next, an operation of determining a tracking object in the entry and exit management system according to the present embodiment is described hereinafter with reference to FIG. 18. FIG. 18 illustrates a flow of an operation in a case where the control unit 12b determines a tracking object using a CPU (not shown) and a program executed thereon.

First, in step S901, the control unit 12b of the entry and exit management apparatus 12 receives a notification of success of authentication from the authentication apparatus 11.

Next, in step S902, the control unit 12b refers to the utilization time period stored in the registrant information storage unit 12a and determines whether the entry time of a user is included in the utilization time period thereof. If the entry time of the user is included within the utilization time period thereof (YES in step S902), the control unit 12b does not determine the user as a tracking object. Thus, tracking-imaging is prevented from being performed. If the entry time of the user is not included within the utilization time period thereof (NO in step S902), the operation proceeds to step S903.

Next, in step S903, the control unit 12b determines whether there is any other user who belongs to the same group as that of the user having an entry time determined not to be included within the utilization time period and enters the room simultaneously with the user or within a predetermined time since the user enters the room and whose entry time is within the utilization time period thereof. If there is any other user who belongs to the same group as that of the user having an entry time determined not to be included within the utilization time period and enters the room simultaneously with the user or within a predetermined time since the user enters the room and whose entry time is within the utilization time period thereof (YES in step S903), the control unit 12b does not determine the user as a tracking object, so that tracking of the user is not performed. If there is not any other user who belongs to the same group as that of the user having an entry time determined not to be included within the utilization time period and enters the room simultaneously with the user or within a predetermined time since the user enters the room and whose entry time is within the utilization time period thereof (NO in step S903), the operation proceeds to step S904.

Next, in step S904, the control unit 12b compares a tracking object upper limit number with the number of tracking objects. The tracking object upper limit number is determined by the number of installed image capturing apparatus 15. If the tracking object upper limit number is larger than the number of tracking objects (YES in step S904), then in step S905, the control unit 12b determines the user as an additional tracking object and changes the record stored in the registrant information storage unit 12a. If the tracking object upper limit number is equal to or smaller than the number of tracking objects (NO in step S904), then in step S906, the control unit 12b takes off a tracking object, whose tracking time is longest among those of tracking objects recorded in the registrant information storage unit 12a, from a category of tracking objects. In addition, the control unit 12b records the user newly entering the room as the tracking object in the registrant information storage unit 12a.

Then, in step S907, the control unit 12b sends information representing the tracking objects recorded in the registrant information storage unit 12a, and a tracking instruction or a recording instruction to the monitoring apparatus 16. The control unit 16b of the monitoring apparatus 16 causes the image capturing apparatuses 15 to perform tracking of the tracking objects or recording of images of the tracking objects according to information received from the entry and exit management apparatus 12.

Thus, in the present embodiment, the utilization time period corresponding to each user is calculated from the history of utilization of the room 10 by the users. Then, according to the difference between the utilization time period and the entry time (or to a result of the determination), more specifically, in a case where a user enters the room 10 in a time period in which the user does not enter the room 10 under ordinary circumstances, the image capturing apparatuses 15 are caused to perform tracking/recording. With such configuration, the observer for the entry and exit management system according to the present embodiment can automatically specify a tracking object to be tracked. Then, the tracking of the tracking object and the recording of an image of the tracking object can be performed. Consequently, the present embodiment alleviates loads for operations of preliminarily determining objects and causing the image capturing apparatuses 15 to perform tracking. In addition, the entry management system according to the present embodiment can be configured to record only an image of a tracking object. Thus, unnecessary video images can be prevented from being recorded. Accordingly, recorded data can be reduced.

Incidentally, according to the present embodiment, in a case where a user enters the room 10 in a time period in which the user does not enter the room 10 in ordinary circumstances, tracking-imaging and recording-imaging of the user can be performed. However, in the imaging-processing, the imaging image quality, the recording image quality, or the frame rate can be changed. In this case, imaging objects to be specified can clearly be imaged. In addition, images of the imaging objects can clearly be recorded.

Next, a fourth exemplary embodiment of the present invention is described hereinafter. The entry and exit management system according to the present embodiment sets priorities of users according to the time difference between the entry time and the utilization time period of each user such that the larger the time difference therebetween of each user becomes, the higher the priority thereof is set. Incidentally, the system configuration of the entry and exit management system according to the present embodiment is similar to that of the third exemplary embodiment, as above-described with reference to FIGS. 10 and 11. Thus, description of the system configuration is not repeated. Incidentally, the control unit 12b of the entry and exit management apparatus 12 according to the fourth embodiment has the above-described function for setting the priorities of users.

The present embodiment is provided with a plurality of image capturing apparatuses 15. It is assumed that the image capturing apparatuses 15 track objects in a one-to-one correspondence manner. In a case where a plurality of users associated with the same group enters the room simultaneously or within a predetermined time period, the priority of a user of this group is reduced by a predetermined value in a case where another user, whose entry time is included within the utilization time period thereof, is included in this group. This predetermined value is set to be "2". A tracking/recording management table, which is set in consideration of the priorities and is used in the entry and exit management system according to the present embodiment when tracking of a user or recording of an image of the user is performed, and the tracking processing and the recording processing, which are performed using this table, are described hereinafter with reference to FIGS. 19 and 20 by taking a situation illustrated in FIG. 11 as an example.

FIG. 19 illustrates an example of each of the entry time corresponding to each user, the utilization time period corresponding to each user, and the tracking/recording management table managed by the entry and exit management apparatus 12. In this example, the users A through D are in the room 10, while the users E and F has not yet entered the room 10. Referring to FIG. 19, the entry time corresponding to each user, which is described in a table 1001, is information stored in the registrant information storage unit 12a in a case where authentication performed by the authentication apparatus 11 is successful. The utilization time period corresponding to each user, which is described in a table 1002, is preliminarily determined and stored in the registrant information storage unit 12a. The tracking/recording management table 1003 is a table used when the control unit 12b of the entry and exit management apparatus 12 manages whether the tracking of the users entering the room 10 or the recording of images of such users is to be performed using the image capturing apparatuses 15. In the tracking/recording management table 1003, the time difference between the entry time of each user and the associated utilization time period thereof is stored in a column 1003a representing the time difference. The priorities set according to the time differences are recorded in a column 1003b representing the priorities. Incidentally, the priority is defined herein as a degree for determining an object on which tracking or recording is preferentially performed. In this example, the time difference corresponding to the user C is the largest among those respectively corresponding to the users. Therefore, the priority of the user C is set at a highest value of 1. Further, the priority of the user B and that of the user C are set at "2" and "3", respectively, in this order.

Next, FIG. 20 illustrates another example of each of the entry time corresponding to each user and the utilization time period corresponding to each user, which are obtained after the users E and F are successfully authenticated in the situation illustrated in FIG. 19, and the tracking/recording management table managed by the entry and exit management apparatus 12. In this example, as is seen by referring to the time difference (1103a), the time difference corresponding to the user E is the largest among those respectively corresponding to the users. However, the user F, who belongs to the same group as that of the user E and enters the room in the utilization time period, enters the room simultaneously with the user E. Thus, the priority of the user E can be reduced by "2" (i.e., "3" shown in the column 1103b). In this case, the priority of the user A and that of the user E are equal to "3". However, according to the present embodiment, the user A, the time difference corresponding to which is small, is taken off the category of the tracking objects. Instead, the user E is newly set to be a tracking object. Incidentally, after the users E and F enter the room 10, it is necessary that the image capturing apparatuses 15 identify the users E and F and track the users E and F. In this case, e.g., a method for installing image capturing apparatuses also outside a management area (i.e., the room 10) and reliably discriminating persons based on faces of the users can be employed as a method for identifying persons. In a case where the users enter the room in the order of performing authentication, a method for discriminating persons, who enter the room, in the order of entering the room by the image capturing apparatus 15 provided close to the door 14 can be employed as the method for identifying persons. Alternatively, a method for regarding a plurality of users as one group and determining the user, who first enters the room, among the users of the group as a tracking object can be employed as the method for identifying persons.

Next, an operation of determining a tracking object in the entry and exit management system according to the present embodiment is described hereinafter with reference to FIG. 21. FIG. 21 illustrates a flow of this operation in a case where the control unit 12b determines a tracking object using a CPU (not shown) and a program executed thereon.

First, in step S1201, the control unit 12b of the entry and exit management apparatus 12 receives a notification of success of authentication from the authentication apparatus 11.

Next, in step S1202, the control unit 12b refers to the utilization time period stored in the registrant information storage unit 12a and determines whether the entry time of a user is included within the utilization time period thereof. If the entry time of the user is included within the utilization time period thereof (YES in step S1202), the control unit 12b does not determine the user as a tracking object. Thus, tracking-imaging is prevented from being performed. If the entry time of the user is not included within the utilization time period thereof (NO in step S1202), the operation proceeds to step S1203.

Next, in step S1203, the control unit 12b refers to the utilization time period closest to the entry time of the user. Then, the control unit 12b calculates the time difference between the entry time and this utilization time period and records the calculated time difference in the registrant information storage unit 12a.

Next, in step S1204, the control unit 12b compares the time difference corresponding to a tracking object, which is recorded in the registrant information recording unit 12a and is lowest in the priority, and the time difference corresponding to the user newly determined as a tracking object. If the time difference corresponding to the user newly determined as a tracking object is equal to or greater than that corresponding to the tracking object, which is lowest in the priority (YES in step S1204), the operation proceeds to step S1205. If the time difference corresponding to the user newly determined as a tracking object is less than that corresponding to the tracking object, which is lowest in the priority (NO in step S1204), the control unit 12b does not determine the user as a tracking object. Then, the control unit 12b finishes the operation.

In step S1205, the control unit 12b determines, based on information read from the registrant information storage unit 12a, whether there is any other user who belongs to the same group and enters the room simultaneously with the user determined in step S1204 or within a predetermined time period since this user enters the room, and who has an entry time determined to be included within the utilization time period thereof. If there is another user who belongs to the same group and enters the room simultaneously with the user determined in step S1204 or within a predetermined time period since this user enters the room, and who has an entry time determined to be included within the utilization time period thereof (YES in step S1205), the operation proceeds to step S1206. If there is no other user who belongs to the same group and enters the room simultaneously with the user determined in step S1204 or within a predetermined time period since this user enters the room, and who has an entry time determined to be included within the utilization time period thereof (NO in step S1205), the operation proceeds to step S1208.

In step S1206, the control unit 12b checks what a value to be subtracted from the priority is. Subsequently, in step S1207, the control unit 12b reduces the priority of the user of the group by a predetermined value in a case where there is another user who belongs to the same group and enters the room simultaneously with the user determined in step S1204 or within a predetermined time period since this user enters the room, and who has an entry time determined to be included within the utilization time period thereof.

Next, in step S1208, the control unit 12b changes the priority of each of the tracking objects recorded in the registrant information storage unit 12a according to the associated time difference. Subsequently, in step S1209, the control unit 12b determines racking objects based on the priorities recorded in the registrant information storage unit 12a.

Then, in step S1210, the control unit 12b sends information of the tracking objects recorded in the registrant information storage unit 12a to the monitoring apparatus 16. The control unit 16b of the monitoring apparatus 16 causes the image capturing apparatuses 15 to perform tracking of the tracking objects and recording of an image of the tracking objects according to information received from the entry and exit management apparatus 12.

Thus, in the present embodiment, the utilization time period corresponding to each user is calculated from the history of utilization of the room 10 by the users. Then, according to the difference between the utilization time period and the entry time, tracking priority is determined.

Then, tracking of the user having high priority or recording of an image of the user having high priority is performed using the image capturing apparatus 15. With such configuration, the observer for the entry and exit management system according to the present embodiment can automatically specify a tracking object to be tracked. Then, the tracking of the tracking object and the recording of an image of the tracking object can be performed. Consequently, the present embodiment alleviates loads for operations of preliminarily determining objects and causing the image capturing apparatuses 15 to perform tracking. In addition, the entry management system according to the present embodiment can be configured to record only an image of a tracking object. Thus, unnecessary video images can be prevented from being recorded. Accordingly, recorded data can be reduced. In addition, a tracking object can be more accurately specified by managing tracking objects using priorities. Accordingly, security accuracy can be enhanced.

Further, according to the present embodiment, in a case where a user enters the room 10 in a time period in which the user does not enter the room 10 in ordinary circumstances, tracking-imaging and recording-imaging of the user can be performed. However, in the imaging-processing, the imaging image quality, the recording image quality, or the frame rate can be changed. In this case, imaging objects to be specified can clearly be imaged. In addition, images of the imaging objects can clearly be recorded.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. A control apparatus for controlling one or more image capturing apparatuses, the control apparatus comprising:
   at least one processor; and
   at least one memory having instructions stored thereon, which when executed by the at least one processor cause the at least one processor to:
      identify an imaging object which enters an imageable area of the one or more image capturing apparatuses;
      determine whether a time at which the imaging object enters the imageable area is within a time period which corresponds to the imaging object which enters the imageable area and which has been registered prior to the imaging object entering the imageable area; and
      determine, according to a result of the determination of whether a time at which the imaging object enters the imageable area is included within a time period corresponding to the imaging object which enters the imageable area, whether the imaging object which enters the imageable area of the one or more image capturing apparatuses is tracked by the one image capturing apparatus or one of the more image capturing apparatuses.

2. The control apparatus according to claim 1, wherein the at least one memory has stored thereon further instructions, which when executed by the at least one processor, cause the at least one processor to:
   calculate the time period from a history of entry by an imaging object into the imageable area.

3. The control apparatus according to claim 2, wherein the at least one memory has stored thereon further instructions, which when executed by the at least one processor, cause the at least one processor to:
   determine a time period, in which the number of times of entries of the imaging object into the imageable area is equal to or greater than a predetermined number of times, as the time period, from the history of entry by the imaging object into the imageable area.

4. The control apparatus according to claim 1, wherein the at least one memory has stored thereon further instructions, which when executed by the at least one processor, cause the at least one processor to:
   determine the imaging object as a tracking object if a time at which the imaging object enters the imageable area is not included within the time period.

5. The control apparatus according to claim 1, wherein the at least one memory has stored thereon further instructions, which when executed by the at least one processor, cause the at least one processor to:
   compare a tracking object upper limit number with the number of tracking objects already tracked,
   determine, if the tracking object upper limit number is greater than the number of tracking objects already tracked, the imaging object as a tracking object, and
   determine, if the tracking object upper limit number is equal to the number of tracking objects already tracked, the imaging object as a tracking object, instead of one of the tracking objects already tracked.

6. The control apparatus according to claim 1, wherein the time period is set corresponding to each imaging object, and
   wherein the at least one memory has stored thereon further instructions, which when executed by the at least one processor, cause the at least one processor to:
   store information on a group to which an imaging object belongs, and
   determine that the imaging object is not tracked if a time at which another imaging object belonging to the same group as that of the imaging object enters the imageable area is included within the time period set for the another imaging object and the imaging object enters the imageable area within a predetermined time since the another imaging object enters the imageable area.

7. The control apparatus according to claim 1, the at least one memory has stored thereon further instructions, which when executed by the at least one processor, cause the at least one processor to: perform authentication when the imaging object enters the imageable area and to identify the imaging object based on a result of the authentication.

8. A method for controlling one or more image capturing apparatuses, the method comprising:
   identifying an imaging object which enters an imageable area of the one or more image capturing apparatuses;
   making an entry time determination on whether a time at which the imaging object enters the imageable area is included within a time period which corresponds to the imaging object which enters the imageable area and which has been registered prior to the imaging object entering the imageable area; and
   determining, according to a result of the entry time determination, whether the imaging object which enters the imageable area of the one or more image capturing apparatuses is tracked by the one image capturing apparatus or one of the more image capturing apparatuses.

9. A non-transitory computer-readable storage medium containing computer-executable instructions for controlling one or more image capturing apparatuses, the medium comprising:

computer-executable instructions for identifying an imaging object which enters an imageable area of the one or more image capturing apparatuses;

computer-executable instructions for making an entry time determination on whether a time at which the imaging object enters the imageable area is included within a time period which corresponds to the imaging object which enters the imageable area and which has been registered prior to the imaging object entering the imageable area; and computer-executable instructions for determining, according to a result of the entry time determination, whether the imaging object which enters the imageable area of the one or more image capturing apparatuses is tracked by the one image capturing apparatus or one of the more image capturing apparatuses.

10. The method according to claim 8, wherein the imaging object is determined as a tracking object if a time at which the imaging object enters the imageable area is not included within the time period.

11. The method according to claim 8, further comprising comparing a tracking object upper limit number with the number of tracking objects already tracked,
wherein if the tracking object upper limit number is greater than the number of tracking objects already tracked, the imaging object is determined as a tracking object, and
wherein if the tracking object upper limit number is equal to the number of tracking objects already tracked, the imaging object is determined as a tracking object, instead of one of the tracking objects already tracked.

12. The method according to claim 8, wherein the time period is set corresponding to each imaging object,
wherein the imaging object is determined not to be tracked if a time at which another imaging object belonging to the same group as that of the imaging object enters the imageable area is included within the time period set for the another imaging object and the imaging object enters the imageable area within a predetermined time since the another imaging object enters the imageable area.

13. The medium according to claim 9, wherein the imaging object is determined as a tracking object if a time at which the imaging object enters the imageable area is not included within the time period.

14. The medium according to claim 9, further comprising comparing a tracking object upper limit number with the number of tracking objects already tracked,
wherein if the tracking object upper limit number is greater than the number of tracking objects already tracked, the imaging object is determined as a tracking object, and
wherein if the tracking object upper limit number is equal to the number of tracking objects already tracked, the imaging object is determined as a tracking object, instead of one of the tracking objects already tracked.

15. The medium according to claim 9, wherein the time period is set corresponding to each imaging object,
wherein the imaging object is determined not to be tracked if a time at which another imaging object belonging to the same group as that of the imaging object enters the imageable area is included within the time period set for the another imaging object and the imaging object enters the imageable area within a predetermined time since the another imaging object enters the imageable area.

16. The medium according to claim 9, further comprising:
performing authentication when the imaging object enters the imageable area; and
identifying the imaging object based on a result of the authentication.

17. The method according to claim 8, further comprising:
performing authentication when the imaging object enters the imageable area; and
identifying the imaging object based on a result of the authentication.

* * * * *